(12) United States Patent
Harvill

(10) Patent No.: US 8,917,424 B2
(45) Date of Patent: Dec. 23, 2014

(54) SCREEN PRINTING TECHNIQUES

(75) Inventor: Young Harvill, El Granada, CA (US)

(73) Assignee: Zazzle.com, Inc., Redwood City, CA (US)

( * ) Notice: Subject to any disclaimer, the term of this patent is extended or adjusted under 35 U.S.C. 154(b) by 668 days.

(21) Appl. No.: 12/790,711

(22) Filed: May 28, 2010

(65) Prior Publication Data
US 2011/0292451 A1    Dec. 1, 2011

(51) Int. Cl.
H04N 1/405    (2006.01)
H04N 1/54     (2006.01)

(52) U.S. Cl.
CPC ........................................ H04N 1/54 (2013.01)
USPC ............ 358/3.03; 358/2.1; 358/515; 358/538

(58) Field of Classification Search
CPC .......................... H04N 1/6038; H04N 21/4312
USPC ................................................... 358/1.1–3.29
See application file for complete search history.

(56) References Cited

U.S. PATENT DOCUMENTS

| | | | |
|---|---|---|---|
| 5,039,132 A | 8/1991 | Anderson | |
| 5,615,123 A | 3/1997 | Davidson et al. | |
| 5,764,308 A | 6/1998 | Lee | |
| 6,456,395 B1 | 9/2002 | Ringness | |
| 7,262,778 B1 | 8/2007 | Edwards et al. | |
| 8,023,746 B2 | 9/2011 | Ackley et al. | |
| 8,184,124 B2 | 5/2012 | Edwards et al. | |
| 2002/0068141 A1 | 6/2002 | Pieper et al. | |
| 2004/0017595 A1* | 1/2004 | Ikeda ............................ | 358/518 |
| 2004/0169892 A1 | 9/2004 | Yoda | |
| 2005/0226498 A1* | 10/2005 | Lee ............................... | 382/162 |
| 2007/0008560 A1 | 1/2007 | Eschbach | |
| 2007/0121131 A1 | 5/2007 | Hauser | |
| 2008/0117305 A1* | 5/2008 | Rogers et al. ............... | 348/222.1 |
| 2009/0019053 A1 | 1/2009 | Burgess et al. | |
| 2009/0080773 A1 | 3/2009 | Shaw et al. | |
| 2009/0109214 A1 | 4/2009 | Harvill et al. | |
| 2009/0122329 A1 | 5/2009 | Hegemier et al. | |
| 2010/0036753 A1 | 2/2010 | Harvill et al. | |
| 2014/0193068 A1 | 7/2014 | Harvill et al. | |

FOREIGN PATENT DOCUMENTS

| | | |
|---|---|---|
| EP | 0 354 490 A2 | 2/1990 |
| EP | 0 481 375 A2 | 4/1992 |
| EP | 0 763 926 A2 | 3/1997 |
| EP | 1 613 054 A1 | 1/2006 |
| WO | WO2009/055738 A1 | 4/2009 |
| WO | WO 2010/022404 A1 | 2/2010 |

OTHER PUBLICATIONS

European Patent Office, European Search Report received in International serial No. 11167993.2-1522, Applicant: Zazzle.com, dated Jul. 25, 2011, 5 pages.

(Continued)

Primary Examiner — Paul F Payer
Assistant Examiner — Marcellus Augustin
(74) Attorney, Agent, or Firm — Hickman Palermo Truong Becker Bingham Wong LLP

(57) ABSTRACT

Data processing methods provide a work flow for producing custom screen printed products based on digital images. Disclosed techniques include a work flow for receiving user-supplied images and transforming the images into color separation data and related metadata that can drive screen printing, including previewing the appearance of the products as they will appear when screen printed, for user approval; finding key color components using a filtering and grouping approach; image resolution limiting; structured error diffusion halftoning with an improved random number generator for use in adding blue noise; error diffusion dot spread correction; and others.

28 Claims, 14 Drawing Sheets

(56) References Cited

OTHER PUBLICATIONS

Current Claims of European International serial No. 11167993.2-1522 dated Jul. 2011, 4 pages.

Ulichney Robert, "A Review of Halftoning techniques" Cambridge Research Lab, Compaq Computer corp., 1 Kendall Sq., Cambridge, MA, United States, published in SPIE, 2000, vol. 3963, pp. 378-391.

Australian Government IP Australia, "Patent Examination Report No. 1", application No. 2011202173, dated Jan. 30, 2014, 3 pages.

Current Claims in application No. 2011202173, dated Jan. 2014, 5 pages.

European Patent Office, "Search Report" in application No. 14150370.6-1902, dated Apr. 3, 2014, 7 pages.

Ehara et al., "Texture Overlay for Virtual Clothing Based on PCA of Silhouettes", IEEE, dated 2006, 4 pages.

Current Claims in application No. 14150370.6-1902, dated Apr. 3, 2014, 4 pages.

* cited by examiner

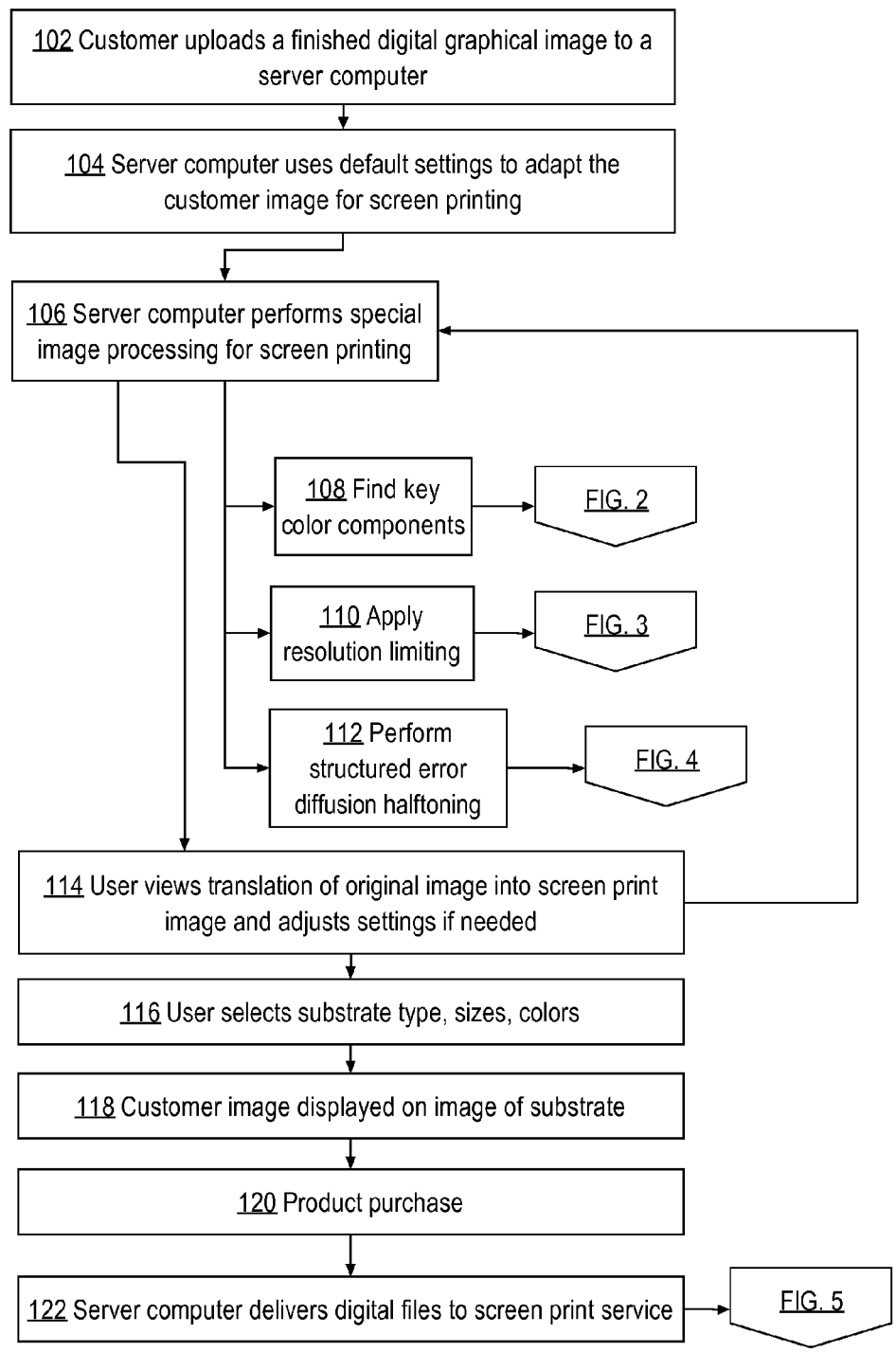

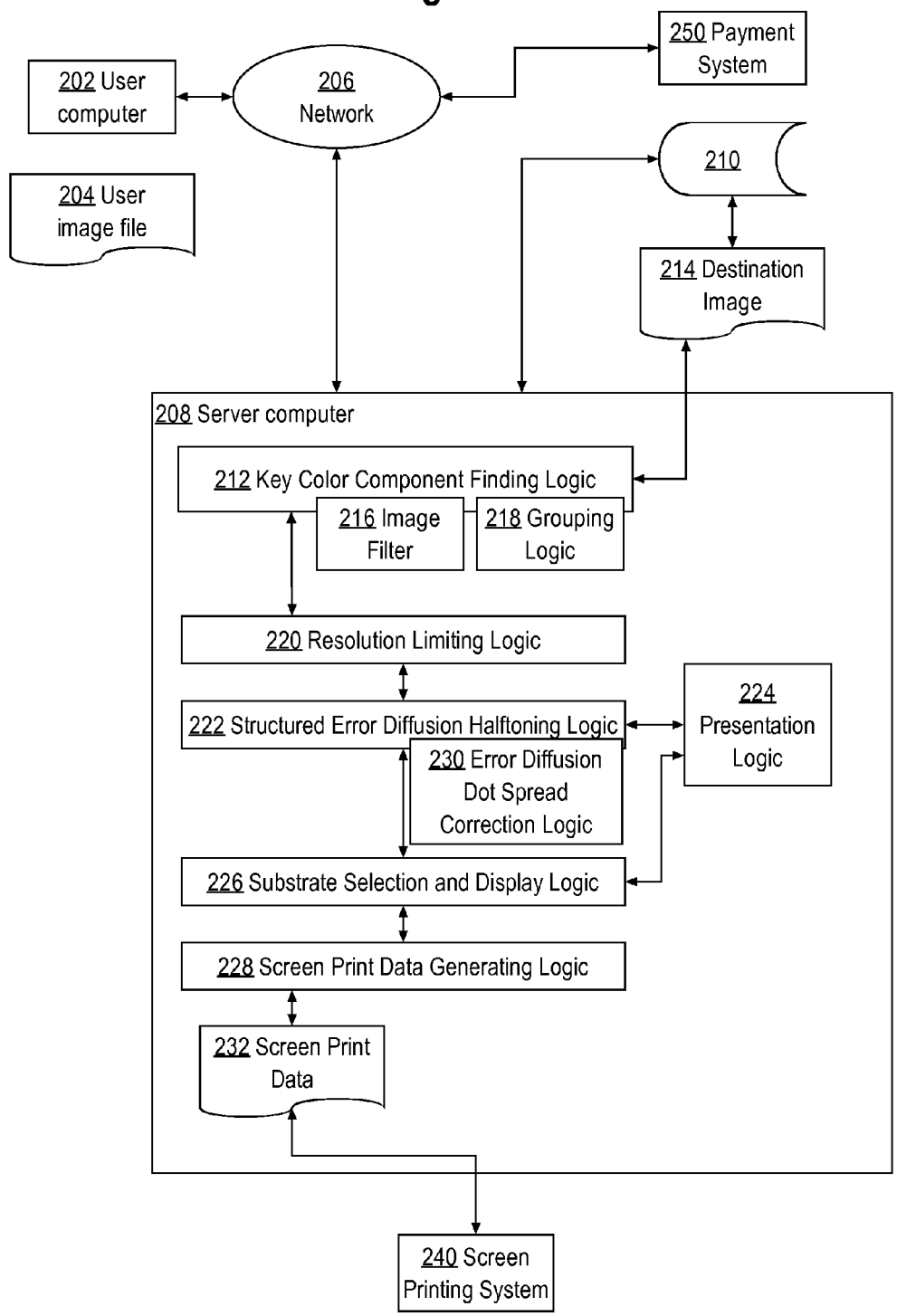

SCREEN PRINTING TECHNIQUES

CROSS-REFERENCE TO RELATED CO-PENDING APPLICATIONS

The present disclosure is generally related to application Ser. No. 11/925,716, filed Oct. 26, 2007, and application Ser. No. 12/511,910, filed Jul. 29, 2009, the entire contents of which are hereby incorporated by reference as if fully set forth herein.

TECHNICAL FIELD

The present disclosure generally relates to data processing techniques for use in screen printing of apparel and other objects.

BACKGROUND

Custom printing of apparel, beverage vessels, novelty items and other objects, based upon user-specified digital graphical images, is presently available in the market. For example, Zazzle, Inc. of Redwood City, Calif. has become a market leader in producing custom-printed products based on user interaction with online servers through a graphical user interface. Most custom printed apparel uses ink-jet printing, or a variation, to produce the final printed product.

In non-computerized printing, screen printing of apparel using fine-mesh screens and screen printing inks is known to provide superior color saturation, appearance and durability as compared to ink-jet printing. "Silk-screened" apparel has been available for some time, based upon manually prepared artwork and screens. The manual labor involved in creating the artwork and screens typically means that screen printing is economically inefficient when used to reproduce small quantities of products. Further, there has been no online system available to create custom screen printed products based on digital images provided by a consumer without such manual editing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 illustrates an example automated process of screen printing using user-provided digital graphic images.

FIG. 2A illustrates a computer configured to process images for screen printing.

DETAILED DESCRIPTION

Figure 2B:
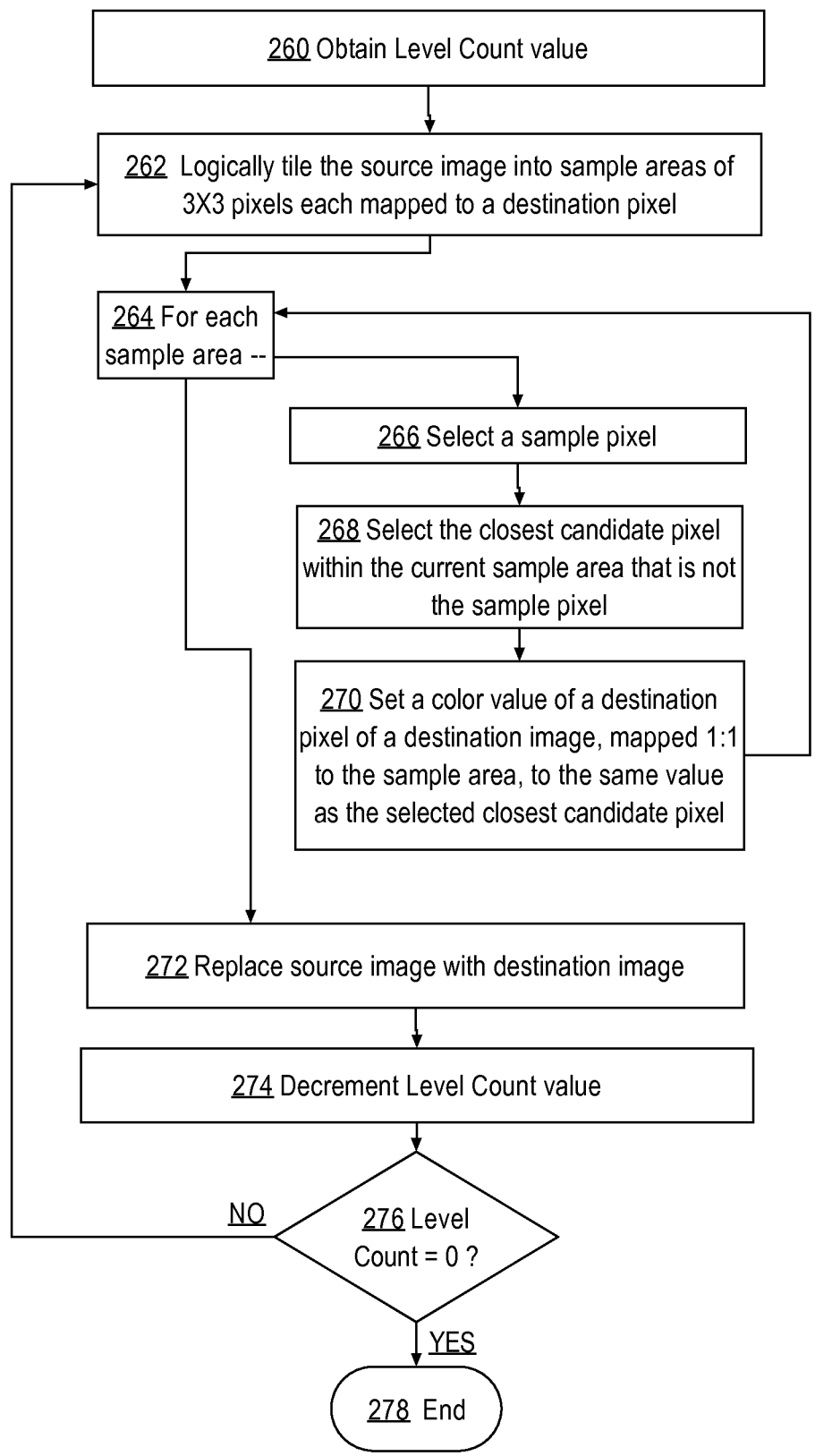
FIG. 2B, FIG. 2C illustrate a process of finding key color components in an image to facilitate printing the image using a screen printing process.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In an embodiment, the disclosure provides a computer-based system and method configured for converting a specified digital graphic file or image into a screen printed product. In an embodiment, the system and method do not require manual art services or customer service interactions, and provide fully automated methods including online user preview and selection of the desired image or graphic conversion. In an embodiment, the system and method are configured to manage the application of the user's approved image to different substrate types. In an embodiment, novel processes provide images for user feedback and imaging for printing.

In an embodiment, data processing methods provide a work flow for producing custom screen printed products based on digital images. Disclosed techniques include a work flow for receiving user-supplied images and transforming the images into color separation data and related metadata that can drive screen printing, including previewing the appearance of the products as they will appear when screen printed, for user approval; finding key color components using a filtering and grouping approach; image resolution limiting; structured error diffusion halftoning with an improved random number generator for use in adding blue noise; error diffusion dot spread correction; and others.

In an embodiment, a computer-implemented method comprises obtaining a request associated with screen printing an image on a product, the request comprising at least one source image, a key color value indicating a number of inks or key colors for use in the screen printing, and a key color area value indicating a minimum area for a particular in the source image to be identified as one of the key colors; transforming the source image to a destination image that is usable in the screen printing of the product, based on the key color value and the key color area value; creating and storing two or more color separation images, each corresponding to one of the inks or key colors; sending the destination image and the separation images for use the screen printing; wherein each of the steps is performed by one or more processors.

2. Example Manual Screen Printing Process

One process using screen printing to produce a customer's screen printed product operates as follows. A customer provides a draft image or sketch of the design they wish to be made into a screen print product to a screen printing service. This is usually done by digital means. The customer may also select a substrate for printing. Example substrates include shirts, hats, and other apparel.

A Customer Service Representative at the screen print service looks at the image and provides a quote for Art Services to convert the image to a form that may be screen printed. A quote is also provided for printing services, and cost of the substrate may also be provided. The quote usually includes size and placement of printed areas on the substrate; number of colors to be printed for each printed area; type of screen printing ink to be used; type of substrate to be printed; number of products to be made; finishing requirements.

The customer agrees or negotiates a price for Art Services, substrate, and Production Services. The customer provides a method of payment. The Customer Service Representative, on receipt of agreement and payment information, initiates the project to make the customer's product. Art Services are performed to convert the original customer design into art which may be screen printed. The customer draft image or sketch is converted to line or vector art with specific outline sizes and fill colors that match the number of colors to be printed. A composite print, including color data, is made of the screen art, and is made available in digital or hardcopy form. The Customer Service Representative sends the composite image to the customer, usually by digital means.

The customer reviews the composite image, and provides verbal directions for modifying the image. The Customer Service Representative directs Art Services to make the required changes. Art Services makes the changes, and updates the composite.

Once the image has been approved, Art Services will make individual images or "color separations" for each color to be printed and provide them to Production. Production produces screens for each color, and mix inks which match these colors. Production prints test product, and make the test product available.

The Customer Service Representative contacts the customer and delivers the test product. The customer approves the test product, or makes verbal corrections. The Customer Service Representative will direct Production to make changes in the screens, or in the color, if needed. The process iterates if there are corrections. When all corrections are complete, Production will print the product, provide finishing, and ship to the Customer.

3. Online Custom Screen Printing

FIG. 1 illustrates an example automated process of screen printing using user-provided digital graphic images involving the following general steps.

In step 102, a Customer uploads a finished image to an automated system. In an embodiment, the automated system is embodied in one or more computer programs that are hosted at one or more server computers of an online service. Each server computer may be structured as described herein in connection with FIG. 6. The term "Customer," in this context, refers broadly to any individual, user, or system that communicates electronically with the automated system. Step 102 may include a first input data communication or Request comprising an input image or plurality of images; a selection for a number of inks or key colors; a selection for the area that a key color must have in the input image; a selection to use or not to use halftones in making the product; and an agreement to buy, or not to buy, the product. The Request may be provided as a result of a plurality of requests and responses or other interactions between a user computer and one or more server computers and logical elements of the server computers. In various embodiments, one or more data items identified in the preceding sentence may be omitted, and other data items may be provided, in the Request. As part of step 102, the image is checked to verify that it meets resolution requirements. A response is provided to the Customer if the image does not have enough resolution for screen printing. The response contains references on how to correct the resolution of the image.

Once an acceptable image is received, at step 104 the automated process uses default settings to adapt the Customer image for screen printing. In step 106, the automated process performs special image processing actions to prepare the image and the system for use in screen printing. In an embodiment, in step 108 the image is limited to a selected number of colors using a process that constrains colors based on closeness in color space and the resolution of a given color feature, as further described in connection with FIG. 2A, FIG. 2B, FIG. 2C and in the section herein titled "Finding Key Color Components." Further, in an embodiment the image colors are matched to a set of metrics based on the inks used for printing.

In an embodiment, at steps 110, 112, the automated process renders the image based on how the image will appear after screen printing, using a set of metrics for the substrate and printing characteristics, as further described in connection with FIG. 3A, FIG. 3B, FIG. 4 and the sections herein titled "Resolution Limiting for Screen Print" and "Structured Error Diffusion Halftoning." Optionally, structured error diffusion halftoning may include error diffusion dot spread correction, as further described herein in connection with FIG. 5.

The result of steps 108, 110, 112 may be to create and generate a preview image that will be displayed at step 114. The approaches of FIGS. 2A, 2B, 2C, 3A, 3B, 4 and 5 may be applied, in various embodiments, to creating and storing a preview image for presentation to the user, or to creating and storing a destination image for communication to a screen printing system associated with a producer of the product, or to creating and storing color separation images for use by the screen printing system, or all of the foregoing.

In an embodiment, the automated system displays the image to the user, displays a set of products which can be made from the image, and displays pricing information for the image. In an embodiment, the automated system provides a Response in the form of an output image representing the Request as it will be realized as a product; an update to the number of inks or key colors; an update to the area that a key color must have in the input image; an update to the selection to use, or not to use, halftones in making the product; and an offer to sell the product. In various embodiments, one or more data items identified in the preceding sentence may be omitted, and other data items may be provided, in the Response. At step 114, the user views the translation of their original image into a screen print image and makes adjustments to one or more of the following settings: number of colors; smallest size of image feature that may have a distinct color; size of the printed image. If the user accepts the rendering of the screen printed product provided by the automated process, the process continues with step 116; otherwise, the process continues with step 106.

As part of steps 116, 118, 120, the user may provide an Order communication to the automated system, comprising an image that represents the image to be applied to the product produced by a preview process, and a separation image for each ink color produced by a separation process. In the Order communication, information identifying image locations or names, in local or network storage, may be provided rather than actual image files. In various embodiments, one or more data items identified in the preceding two sentences may be omitted, and other data items may be provided, in the Order. At step 116, the user may select substrate types, sizes and colors which may receive the image(s). At step 118, the automated system displays the customer's image on the selected substrates. In an embodiment, the product is displayed with the image adjusted for how it will print as a screen print and is displayed with the proper substrate, color and size. The product is displayed on a model that indicates fit and image positioning. Thus, the Customer can see the product displayed in its final form as though it were printed and placed in a context that shows image position and size, and can review the product in this form before committing to purchase.

At step 120, the Customer purchases the product using a payment interface or online shopping cart system. At step 122, the automated process provides the following data to an external Screen Print Service: Screen color separations; ink specification and guidelines; color corrected images for software proofing; screen registration and alignment; platen registration and alignment for the Screen Press; substrates batching with interleave sheets indicating platen alignment; screen printing order; finishing directions; shipping data. In an embodiment, the automated system prepares the screen color separations as further described herein in connection with FIG. 5A and the section titled "Error Diffusion Dot-Spread Correction."

Aspects of FIG. 1 may be organized as a preview process comprising process steps to construct the Response from the Request, and a separation process comprising process steps to construct an Order from a Request, for example, using any of the particular processes further described herein. Further, aspects of FIG. 1 may be implemented using the techniques disclosed in application Ser. No. 11/925,716, filed Oct. 26, 2007, and application Ser. No. 12/511,910, filed Jul. 29, 2009, the entire contents of which are hereby incorporated by reference as if fully set forth herein. For example, the referenced disclosures can be used to implement receiving or generating requests, responses, and orders, and generating and displaying preview images, and payment and other order processing functions.

FIG. 2A illustrates computers configured to process images for screen printing. The arrangement of FIG. 2A may be used to implement FIG. 1 and the other processes that are further described herein in the following sections. In an embodiment, a user computer 202 stores or can access a digital user image file 204 representing graphics, text or other information that the user desires to screen print on substrates or products. User computer 202 is coupled to a network 206, which broadly represents any combination of local networks, wide area networks, internetworks, and globally interconnected networks. User computer 202 may host means to interact with a user or customer to construct the Request, such as a web browser, or client logic or client software. User computer 202 also may host means to interact with the server computer 208 to present the Response to the Customer, such as a web browser, or client logic or client software.

A server computer 208 is coupled to network 206, to storage 210, and to a screen printing system 240. In an embodiment, server computer 208 is owned, operated or associated with an enterprise that provides for ordering custom printed products. In an embodiment, server computer 208 is configured with one or more elements of logic, computer programs, or other software elements that implement the processes further described herein. The server computer 208 generally is configured to receive user image file 204, process the image file as described herein, and store one or more destination images 214, other image metadata, and other data values in storage 210 or in main memory.

Server computer 208 may comprise one or more to interact with the user computer 202 to receive Requests, means to interact with a service to construct the Response, means to interact with the user computer 202 to deliver the Response, means to interact with the service to produce the Order if the Request contains a true agreement to buy the product, and means to communicate with a producer computer associated with screen printing system 240 to deliver the order. Each means, in an embodiment, may comprise one or more elements of computer logic, computer programs, or other software elements that are configured to perform the processes that are further described herein. In some embodiments, the means may include logic, programs, or other software elements that implement other functions.

Server computer 208 also is configured to generate screen print data 232 for communication to a screen printing system 240, which can use the screen print data 232 to perform screen printing and produce end product. Screen printing system 240 generally comprises one or more stencils, each comprised of open printing areas and closed non-printing areas and constructed from a color separation image. Screen printing system 240 further comprises ink, comprised of a pigment or dye and a means for attachment to the substrate; an applicator, which pushes or pumps ink through the stencil; and printing apparatus structured to use the applicator to pump ink through the stencil and onto the substrate.

The screen printing system 240 is configured to print on a product comprising a substrate or carrier that may also have utility as apparel or some other useful item, and an image or plurality of images comprising layers, or a plurality of layers of ink applied to the substrate by the processes described herein. Screen printing system 240 further comprises a producer computer that hosts one or more means to interact with the server computer 208 to communicate orders and means for the screen printing system to create the product.

In an embodiment, server computer 208 comprises key color component finding logic 212, resolution limiting logic 220, structured error diffusion halftoning logic 222, substrate selection and display logic 226, presentation logic 224, and screen print data generating logic 228. In an embodiment, key color component finding logic 212 comprises circuits, logic, stored computer programs or other software elements, or a combination, that are configured to perform a process of finding key color components in the user image file 204 for purposes of preparing the image for screen printing, and may implement the processes of FIG. 2B, FIG. 2C. Logic 212 may include or implement image filter logic 216 and grouping logic 218 for filtering image data and grouping pixels using the techniques herein to result in creating and storing a destination image 214 and related metadata identifying key color components of the user image file 204. In an embodiment, resolution limiting logic 220 comprises circuits, logic, stored computer programs or other software elements, or a combination, that are configured to perform a process of limiting the resolution of the destination image 214 for further preparation of the image for screen printing, and may implement the processes of FIG. 3A, FIG. 3B. In an embodiment, structured error diffusion halftoning logic 222 comprises circuits, logic, stored computer programs or other software elements, or a combination, that are configured to perform a process of structured error diffusion halftoning to further prepare the image for screen printing, and may implement the processes of FIG. 4, FIG. 5A. The logic 222 may include or implement error diffusion dot spread correction logic 230 for the purpose of applying dot spread correction to images in preparation for screen printing.

In an embodiment, screen print data generating logic 228 comprises circuits, logic, stored computer programs or other software elements, or a combination, that are configured to perform step 122 of FIG. 1. In an embodiment, substrate selection and display logic 226 comprises circuits, logic, stored computer programs or other software elements, or a combination, that are configured to perform interacting with a user to receive a selection of a substrate and to cause displaying a representation of an image, which has been fully processed in preparation for screen printing, on a display unit of the user computer 202. In an embodiment, presentation logic 224 comprises circuits, logic, stored computer programs or other software elements, or a combination, that are configured to implement a web server, dynamic generation of HTML and other electronic documents, and other functions of a presentation layer.

In an embodiment, substrate selection and display logic 226 and presentation logic 224, or other stored programs, or other elements of server computer 208 and the process of FIG. 1 may be integrated into a custom product visualization process and/or a custom product work flow as described in application Ser. No. 11/925,716, filed Oct. 26, 2007, and application Ser. No. 12/511,910, filed Jul. 29, 2009, the entire contents of which are hereby incorporated by reference as if fully set forth herein.

A payment system 250 is coupled to network 206 for communication with user computer 202 and server computer 208. Payment system 250 may be co-located with server computer 208 or may be independent. Payment system 250 is configured to implement ordering and payment functions such as an electronic shopping cart and interfacing with credit card payment processing services, merchant services, or clearinghouses.

4. Finding Key Color Components

Unlike many other print processes, screen printing process can print many (typically from 1 to 16) layers of ink in colors prepared from an infinite range of custom ink colors. In an embodiment, an automatic computer-based process is configured identify the key color components of an image that can be used to specify the color of ink, and the print order for producing a Screen Print. For example, if a digital image file in the Joint Photographic Experts Group (JPEG) format can be rendered using 256 colors, the process herein is configured to identify the key color components of the image that can be used to select a set of ink colors that can effectively render a screen print of the image.

In general digital image processing, finding the key colors of an image typically use a variant of k-clustering. The usefulness of color clustering in finding palettes for 8-bit palletized image formats has generated a number of optimized implementations that can find sets or larger numbers (64 to 256) of colors for compression of images and display on limited resolution devices. However, many of these algorithms do not perform well for finding a limited set of key colors in an image. Screen printing imposes a practical limitation on the number of colors that may be printed, typically from 2 to 16 colors.

In an embodiment, a process for finding key ink colors of an image for screen printing can: 1. Find key colors that are actually in the original image, not a sample of multiple image colors; 2. Find colors that are well-represented in the image, that is, represent a large enough area to be a key color; 3. Find colors that represent the outer bounds of the color space, so that they may be used to visually mix other colors. In an embodiment, the preceding three goals are accomplished using two general steps:

1. Filter the image so that contiguous color areas that are close in color space are preserved, and represented by a good candidate color. The candidate color is a member of the contiguous area, not a weighted sample of the type that might be produced by bilinear or Gaussian sampling, and is not a blend of separate candidate components, as produced by component-based median sampling. Color areas that are not contiguous, which could be called color noise, are filtered out.

2. Group the color elements in the filtered image into n groups, where n is the number of colors to be used for screen printing, typically from 2 to 16. The color elements are placed in groups that are the maximum distance apart from one another in color space. Group centers are not chosen stochastically, as in k-clustering, but are chosen by population and by maximizing the separation.

Figure 2C:
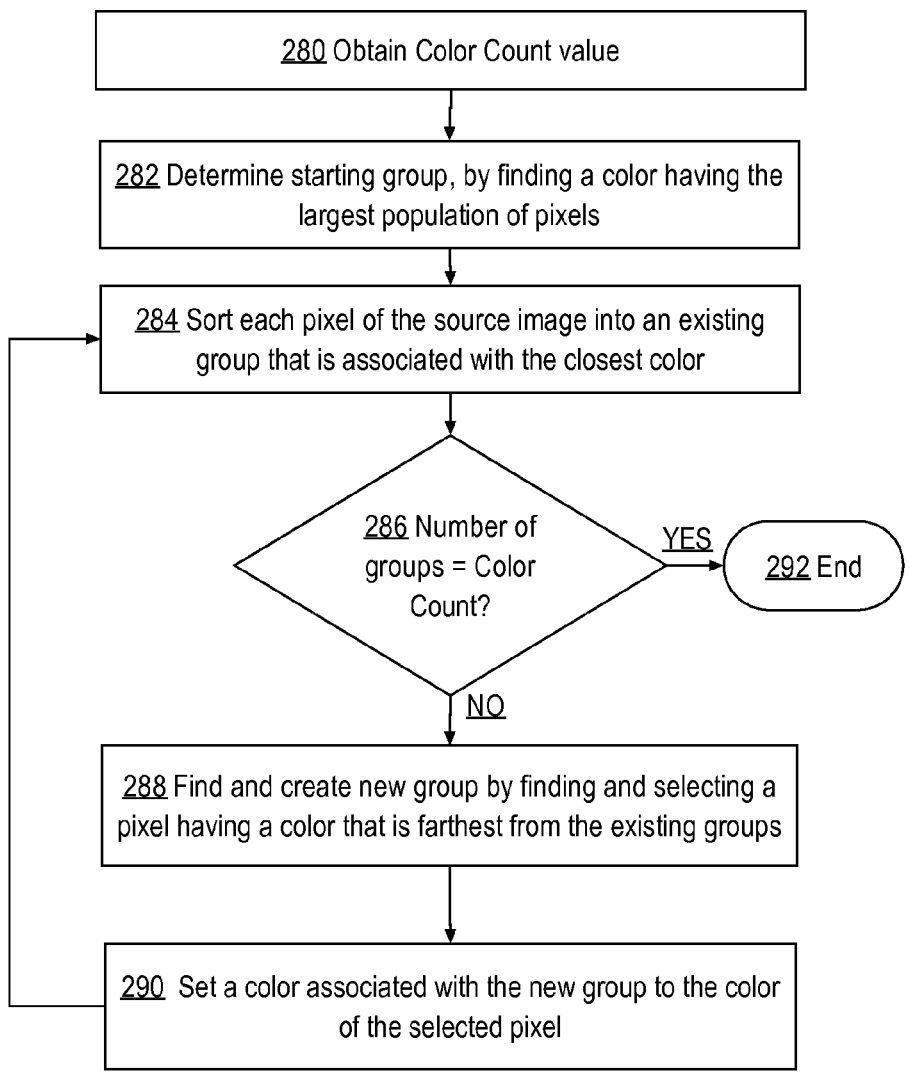

FIG. 2B, FIG. 2C illustrate a process of finding key color components in an image to facilitate printing the image using a screen printing process. FIG. 2B represents a filtering task and FIG. 2C represents a grouping task.

Referring first to FIG. 2B, in an embodiment, in the filtering task, at step 260 a Level Count value is obtained. The Level Count value represents how much area a color must occupy to pass the filtering task. In an embodiment, the Level Count value is user configurable; for example, the Level Count value can be specified in a graphical user interface.

The process of FIG. 2B presumes that before the process starts, a graphic image has been received from a user who desires to screen print the graphic image on a product, and the graphic image has been stored in computer storage. For example, user computer 202 uses network 206 to provide user image file 204 over the network to server computer 208, which stores the user image file in storage 210. The received image file is termed a source image herein. In the process of FIG. 2B, the user image file 204 is transformed in memory of server computer 208 or on storage 210 into a destination image that is more suitable for screen printing on products.

Figure 2D:
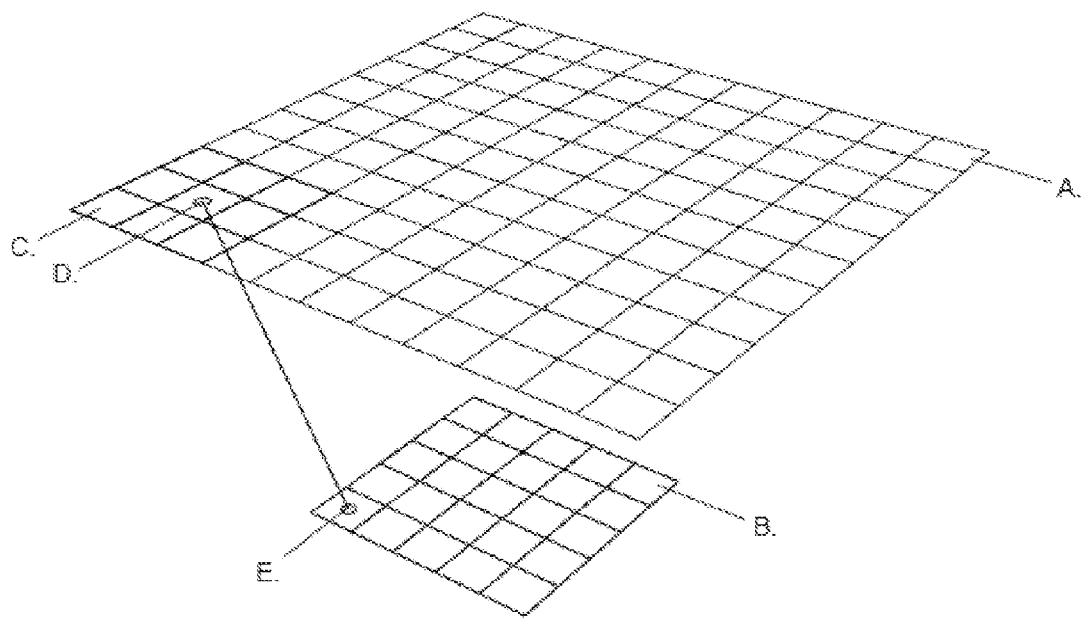
FIGS. 2D, 2E illustrate mapping sample areas of a source image to particular pixels of a destination image.
Figure 2E:
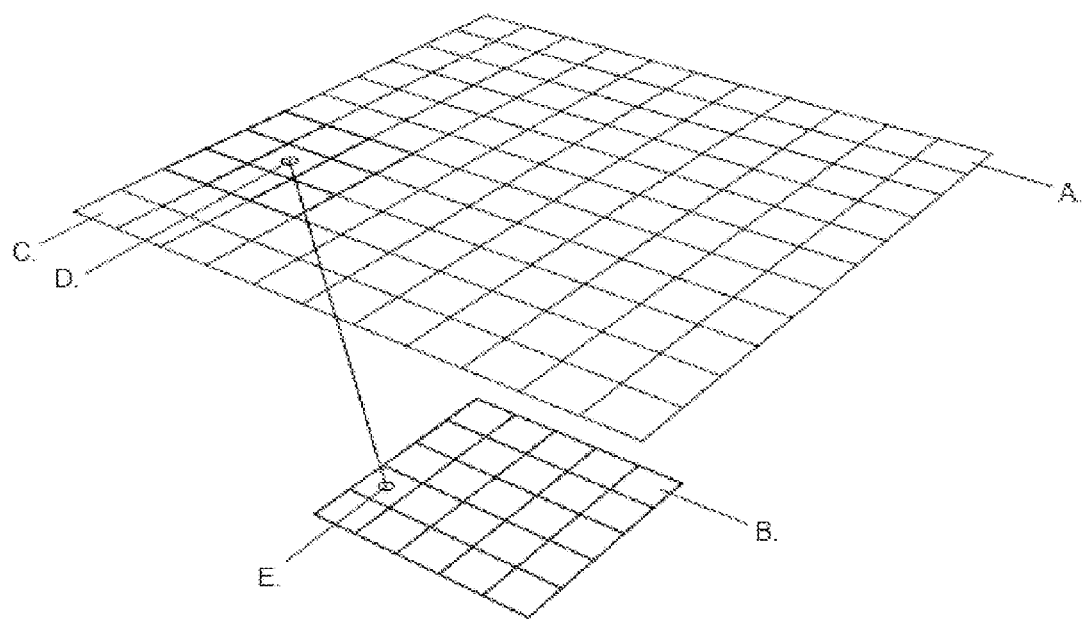

In step 262, the process logically tiles the source image specified by the user into sample areas of 3×3 pixels in size. The 3×3 sample areas may overlap in the source image. In an embodiment, there is a one to one mapping between each 3×3 sample area in the source image and one different particular pixel of a destination image. FIGS. 2D, 2E illustrate mapping sample areas of a source image to particular pixels of a destination image. FIG. 2D illustrates a relationship of a source image A to a destination image B in which a first 3×3 sample area C maps to a pixel E of the destination image. As seen in FIG. 2E, similarly, a second 3×3 sample area of the same source image A maps to a different pixel E of the destination image.

Step 264 represents initiating a loop in which steps 266, 268, 270 are performed for each 3×3 sample area in the image. Thus, for each sample area in the source image, in step 266 a sample pixel is selected. In step 268, the process selects or finds the closest candidate pixel within the sample area that is not the sample pixel. "Closest," in this context, refers to closeness in color space. The particular pixel of the destination image that maps to the current sample area is set to the value of the found candidate pixel, at step 270. Processing continues at step 266 until all sample areas of the source image are processed.

In step 272, the source image is replaced by the destination image in memory or in storage 210. In step 274, the Level Count value is decremented to reflect the fact that a further level of processing is complete. At step 276, the process tests whether the Level Count value is zero; if not processing continues at step 262, in which the new (replaced) image is again tiled into new sample areas and each sample area is re-processed. If the Level Count value is zero, then processing ends at step 278.

Referring now to FIG. 2C, in step 280 a Color Count value is obtained. The Color Count value determines a number of colors, which correspond to layers of screen print ink, are to be used for printing the final image on a product. In an embodiment, a user of user computer 202 (FIG. 2A) inputs a value for the Color Count in a graphical user interface that is provided by server computer 208, in connection with initiating an order for screen printing or when providing user image file 204. Thereafter, and after FIG. 2B, FIG. 2C can be used to find key color groups in the filtered source image.

In step 282, a starting key color group is determined, by finding in the filtered source image a particular color having the largest population of pixels in the image. The particular color is associated, in computer memory of server 208 or storage 210, with information defining the starting key color group. For example, each group referenced in FIG. 2C may be stored as an abstract data structure in memory having a group number attribute and a color attribute.

In step 284, the process sorts all source image pixels into the group having the closest color. "Closest" and "farthest," in this context, refer to distance in color space. In a first pass through FIG. 2C, all source image pixels will be placed in the starting group and the total number of then existing groups will be 1. "Sorting," in step 284, refers to placing a pixel into a group; in subsequent passes through FIG. 2C, sorting may involve removing a pixel from one group and placing that pixel in a different, newly created group that is associated with a color that is closer. Placing a pixel in a group may comprise storing, in the data structure representing a group, pixel identifying information such as a pixel number, address, or coordinates.

In step 286, the process tests whether the current number of groups equals the Color Count value. If so, then the process ends at step 292. If the test of step 286 is false, then at step 288 the process finds and creates a new group is found by finding the pixel color in the source image that is farthest in color space from existing groups. The new group's color is set to the found pixel color in step 290 and processing continues at step 284. In this manner, pixels are re-considered and moved to the color group that is associated with a color closest to the color of the pixels, and the process concurrently develops exactly the number of groups that corresponds to the desired number of screen print image colors or color separations.

5. Resolution Limiting for Screen Printing

In an embodiment, as noted above for step 110 of FIG. 1, special image processing for screen printing comprises applying resolution limiting to a filtered source image for which key color groups have been determined. Resolution limiting is provided in part because the amount of image detail that may be reproduced using screen printing is limited. For example, certain fine details of a user's source image may be impossible to show in the final printed product, because of the relative coarseness or low resolution of the printing screens as compared to the resolution of the digital image. In an embodiment, an organization implementing the techniques herein may perform tests of actual screen printing that determine the resolution limits of a particular combination of the screen fabric, ink, squeegee used to press ink through the screen onto the substrate, and the substrate. In an embodiment, the techniques herein assist a designer to know, before actually printing the product, what an image will look like when it is reproduced in screen printing. In an embodiment, the processes herein can visually depict how a given image will be changed when it is printed, and can apply resolution limits to final artwork for screen printing to improve manufacturing consistency.

Imposing resolution limits on an image may be performed using a band-pass filter by subtracting a Laplacian filter, or unsharpening to limit the frequency matching the resolution limit. The resulting image can have a threshold applied to return the image to a high-contrast state. The resolution limits may be set to the screen mesh frequency divided by 4 or 6. Applying filters in this manner may not match the resolution limits imposed by a particular screen printing process.

The application of screen ink through the screen mesh can be compared to the following model. A stencil element with a thickness of about one quarter of the screen mesh is attached to the mesh. The mesh limits the size of stencil fragment which will attach to it. The stencil fragment may have features that are finer than the supporting mesh. The ink system, in which a squeegee pushes ink through the mesh, acts as a pump that floods the stencil. Continued pumping casts the ink through the stencil and onto the substrate. In this model, the absence or presence of the stencil (as in masking a small area) is determined by the screen mesh size, but the sharpness of how the stencil's features are transferred to the substrate are determined by ink diffusion in the substrate, ink and squeegee characteristics.

In an embodiment, a process for limiting image resolution for screen printing involves generating the initial image at a resolution consistent with ink diffusion limits. If a masking image area does not cover enough pixels to enable the stencil to attach to the screen mesh, it will be filtered out. If a printing image area does not have enough area to have access to a screen mesh opening, it will be filtered out. Smaller features that have sufficient connection to a larger feature group will not be filtered. If their connection is too small, it will be filtered out because the features cannot be represented in the final image on the substrate.

In one embodiment, a process involves generating the initial image at two to four times the resolution limits imposed by the screen mesh. The initial image is usually a separation for spot color printing. The best multiple of two to four is determined by measuring ink diffusion during the Reflection Flow part of the screen printing process. The screen mesh resolution limit will be slightly less than the Nyquist sampling limit imposed by the screen mesh.

Figure 3A:
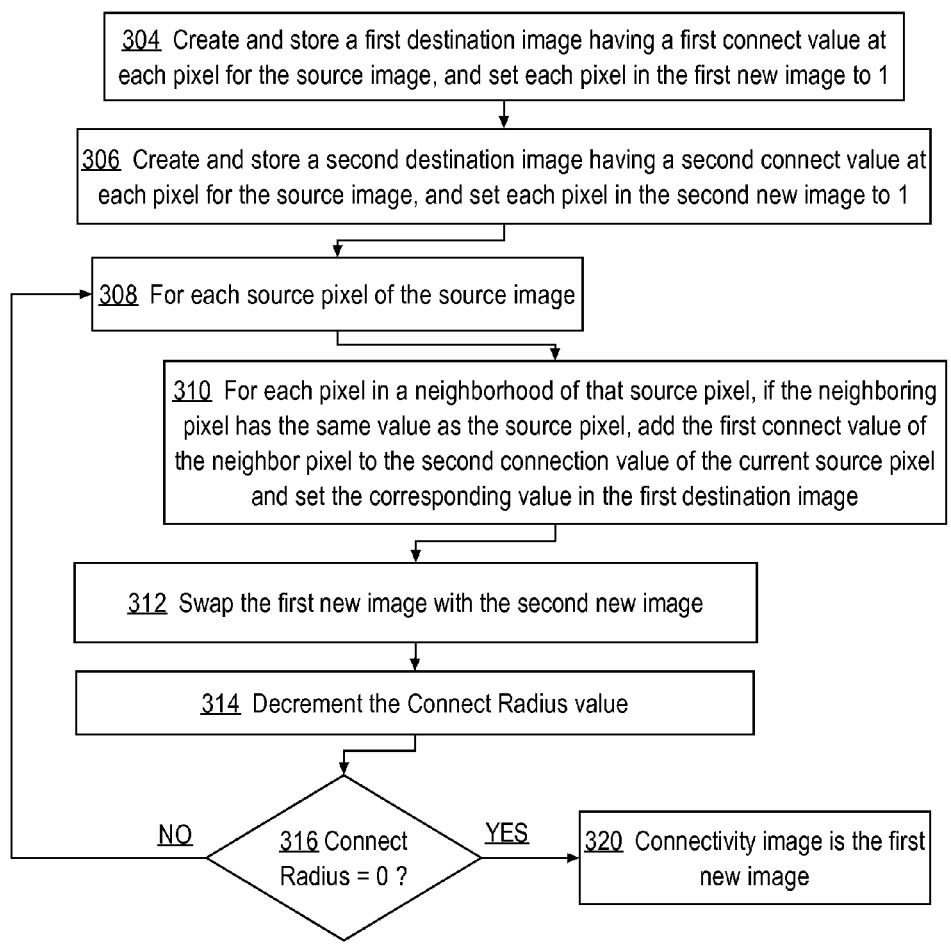
FIG. 3A illustrates finding an amount of connectivity for each printing pixel in the image to other similar printing pixels.

The process finds an amount of connectivity for each printing pixel in the image to other similar printing pixels, as further described for FIG. 3A. In an embodiment, the preceding step involves creating and storing image data that holds the connectivity information for each pixel. Each pixel in the image that does not have sufficient connectivity is marked, as further described below. Each marked pixel in the image is replaced by a value of a pixel in the resolution neighborhood that has the best connectivity as further described for FIG. 3B. The processes presume that storage 210 or memory of the server computer 208 has data for an image that has a color index for its printing color at each pixel.

Referring now to FIG. 3A, a process of creating and storing connectivity information involving steps 304 to 320 is performed based on a Connect Radius setting, and iterated a number of times equal to the Connect Radius value. In step 304, the process creates and stores a first new image that will have a first connect value at each pixel for the source image, and sets that connect value for each pixel in the first new image to 1. In step 306, the process creates and stores a second new image that will have a second connect value at each pixel for the source image, and sets that connect value for each pixel in the second new image to 1.

Step 308 represents starting a loop in which each source pixel in the source image is processed. At step 310, for each pixel in a neighborhood of the current source pixel, if the neighborhood pixel has the same value as the source pixel, then the neighbor pixel's first connect value is added to the source pixel's second connect value.

In step 312, the first new image and all its connect values are swapped with the second new image and all its connect values. At step 314, the Connect Radius is decremented.

At step 316, the process tests whether the Connect Radius equals 0. If not, the process continues at step 308 to make further passes over the image. Otherwise, processing is completed at step 320, in which the Connect Radius is restored, and the resulting first connect value image at that point is the connectivity image for use in subsequent processing.

In an embodiment, marking each pixel that does not have enough connectivity is performed based on a configurable value that may be denoted Connect Threshold. In an embodiment, for each pixel in connectivity image that was formed through the process of FIG. 3A, if the connect value for the pixel is less than the Connect Threshold, then the pixel is marked to be replaced.

Figure 3B:
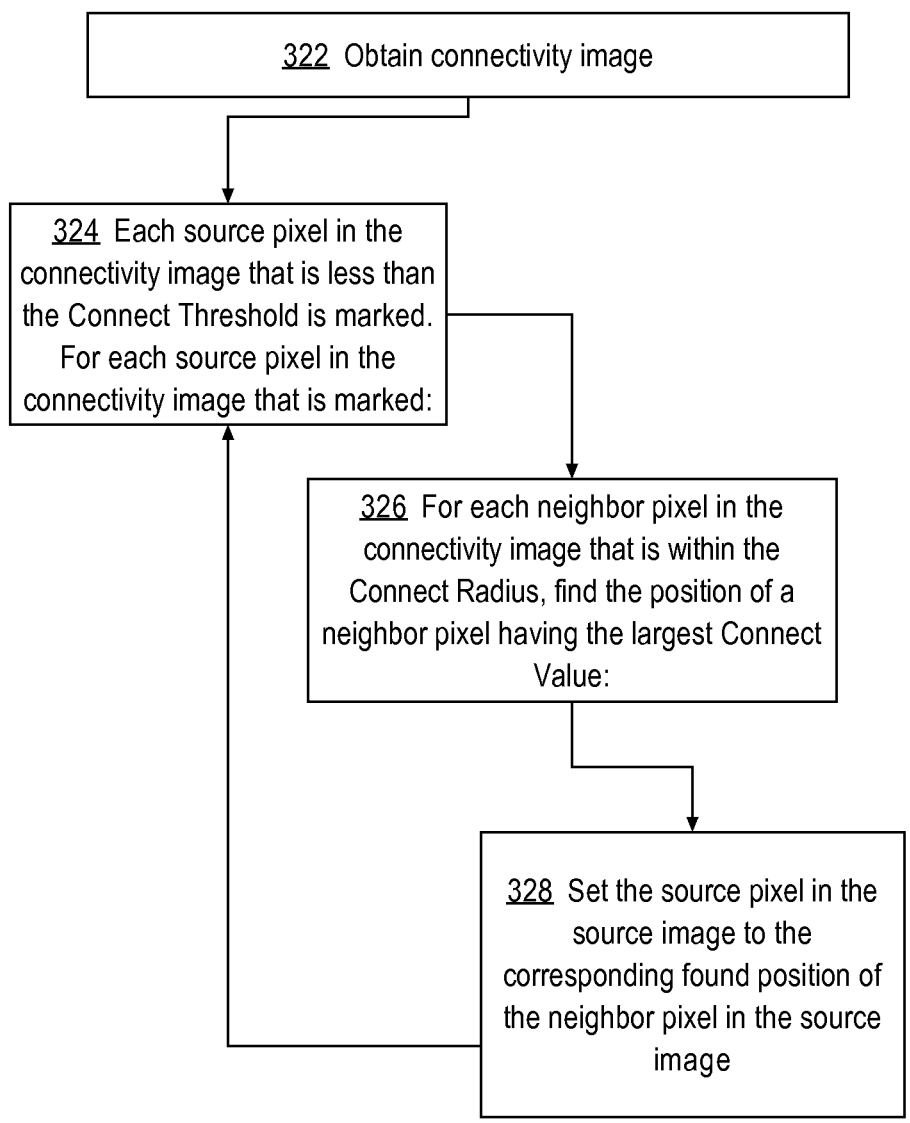
FIG. 3B illustrates marking each pixel in the image that does not have sufficient connectivity is marked.

Referring now to FIG. 3B, a process of replacing each marked pixel may initiate at step 322 by obtaining a connectivity image, such as the connectivity image that was created through the process of FIG. 3A and marked as in the preceding paragraph. Thus, each source pixel in the connectivity image that is less than the Connect Threshold has been marked. Step 324 represents initiating a loop that considers each source pixel in the connectivity image that is marked. For each source pixel in connectivity image that is marked, in step 326, the process examines each neighbor pixel in the connectivity image that is within a distance equal to the Connect Radius and finds the position of a neighbor pixel having the largest Connect Value that is largest. In step 328, the process sets the source pixel in the source image to the corresponding found position of the neighbor pixel in the source image.

As a result, memory of the server computer 208 or storage 210 store a fully processed source image that has an image resolution limited to a value appropriate for screen printing. During the processing, details not capable of reproduction in screen printing are removed. The resulting source image may be displayed at user computer 202 so that a user can examine an expected appearance of a final screen printed product. If the source image is unacceptable, then the user may adjust the configurable parameter values identified above and repeat the process on the same original source image, or substitute a new source image for processing, until acceptable results are obtained.

6. Random Number Generator for Position-Based Blue Noise

While limits on resolution may not be strictly tied to the screen fabric's mesh frequency, certain image elements, such as halftone dots and other higher frequency textures, will be band limited by the screen fabric's mesh frequency. At certain frequencies, such image elements may cause Moiré patterns or other interference patterns. These patterns can be precluded if the distribution of the image elements is randomized. Therefore, embodiments use a process to generate a random number or noise value in the range of (0 . . . 32) that is consistent based on image pixel position. In an embodiment, the noise value is accessible per-pixel so that the same results are obtained if an image is cropped, or if parallel processing is used. The random number can be used to bias an image with noise to result in minimizing the interference effects of the screen fabric's carrier frequency. Since the noise is injected into the image at the highest possible frequency per pixel, the random number values are termed blue noise.

The type and quality of random number generators varies widely in practical use. Most implementations for producing blue noise use random number generators that are provided as part of common computer program development frameworks. Low level graphics services, such as those found in the Flex and Macromedia Flash software development kits, or in Adobe Photoshop, implement a noise function that is proprietary. The quality of the noise produced by these services, or by a given vendor's low-level printing support can be evaluated by resizing its output using point sampling, and verifying that its output still appears random, and is of the same apparent fineness as the input image. In short, a truly random blue noise image will appear to have the same quality of blue noise when point sampled at any sampling frequency.

Implementations of blue noise that use x,y position as a seed for common 32-bit random number generators, such as Multiply With Carry (MWC) Multiplicative Linear Congruent Generators (LCG) and Marsaglia Shift XOR in one or two dimensional implementations, without additional randomizing stages, produce noticeable visual artifacts. These approaches may need three or more stages of randomization to preserve the range of the space and produce some apparent randomness, with each stage requiring a minimum of four (LCG) to six (Shift XOR) CPU clock cycles.

For screen printing, in an embodiment, a high quality random output is provided from an input that is not complex, typically pixel (x, y) values in the range (0 . . . 16384). The required output is also of limited range, for example, (0 . . . 255). These attributes are not met by conventional random number generators that are meant to be called iteratively, and that have been constructed to optimize unique output for many iterations. The coefficients for standard generators are chosen to extend the number of iterations they may be called before repeating a pattern, not for providing the best randomness in a few iterations.

In an embodiment, a blue noise generator for screen printing produces fine-grained blue noise when point sampled at any frequency. In an embodiment, the generator receives values for x,y pixel position as input and outputs a consistent random output in the range of (0 . . . 255). In an embodiment, the generator may perform quickly, on the order of less than 10 CPU clock cycles per pixel to produce output. In an embodiment, a blue noise generator uses a series of operations that scramble the inputs efficiently, using an ordered process that distributes and randomizes each input; combines the randomized inputs in a way that strengthens randomness (such as add or XOR); applies another ordered process that further randomizes the combined inputs; and uses the highest quality bits of the combined calculation for output.

In an embodiment, a process is based on binary multiplication, which can scramble an input multiplicand based on a multiplicative constant, and output a more random product. While the output of a single multiplication by a constant is not sufficiently random for quality output, a series of these constants may extend the range and dimensionality of the blue noise space, and to randomize its output in a visually pleasing way.

In an embodiment, binary multiplication is represented as follows. A binary multiplicative constant is composed of a string of ones and zeros. The output product is set to zero. For each place value in the multiplicative constant that holds a one, the multiplicand is shifted to that place value and the result is accumulated in the product.

It is possible to find multiplicative constants that scramble or randomize an input multiplicand in an optimal way by evaluating the qualities the constant should possess. In particular, an optimal binary multiplicative constant will not comprise only ones or zeros. Multiplication will disperse the bits of an input multiplicand optimally if there is a fair and intermittent spacing between ones and zeros. The randomness of the accumulated product is strengthened by the accumulation in the binary multiply; the highest quality randomized portion of the product will be the high order bits. A series of well-formed binary substrings may be composed that perform randomization well. The substrings may be chosen so that they do not amplify patterns or artifacts; the substrings should be different in length, bit density and bit distribution. Example substrings are prime numbers from 2 . . . 23, omitting 7, represented as in TABLE 1.

TABLE 1

EXAMPLE BINARY SUBSTRINGS

'10'
'011'
'101'
'1011'
'1101'
'10001'
'10011'
'11001'

Concatenating all of these substrings forms a binary number 31 bits in length. A set of 32 bit numbers may be described by assembling the substrings in all possible combinations. The resulting set is factorial(8) in size and has 40320 members. In an embodiment, a value denoted multiplicativeConstantIndex from 0 to 40319 is mapped to a particular member of this set using the following steps:

The 8 substrings are placed in an ordered list. An indexCount is generated starting at 8, and decrementing by 1 until it is 1. For each indexCount (8 to 1), the process performs: Set itemCount to multiplicativeConstantIndex modulo indexCount; Set multiplicativeConstantIndex to multiplicativeConstantIndex divided by itemCount; Remove the itemCount'th item from the ordered list; Concatenate the found item with the multiplicativeConstant.

In an embodiment, three multiplicativeConstants may be chosen as follows. Three multiplicativeConstantIndex values are chosen at random. Three multiplicativeConstant values are formed from these indices. These three constants are used to generate an image using the steps that are further described herein. The image is evaluated visually or automatically to have well-formed blue noise. If the image is well-formed, the three constants are used. The multiplicative constants are generated before compiling a computer program that uses them for image generation, and do not need to be generated at runtime.

In an embodiment, structured error diffusion halftoning logic 222 of FIG. 2A comprises a blue noise generator that is configured to generate a blue noise value (0 . . . 255) for an image pixel (x, y) using digital logic or computer programs that implement the pseudocode of TABLE 2.

TABLE 2

PSEUDOCODE FOR BLUE NOISE GENERATOR noiseValue = x * multConstant0
noiseValue = noiseValue xor (y * mulConstant1)
noiseValue = noiseValue xor (noiseValue * mulConstant2)
noiseValue = (noiseValue >> 24) & 255;

In an embodiment, three 32 bit multiplications and three 32 bit XOR operations are used, which have been found to use 9 clock cycles on an Intel x386 processor core. This compares favorably with single stage random number generators, such as 32 bit Masaglia's shift-XOR, that will noticeable visual artifacts when used as a single stage generator.

In embodiments, a candidate multiplicative constants may be generated by concatenating binary sub-strings that are chosen for their difference in length, bit distribution and bit density. Each member of the set of multiplicative Constants may be mapped to an index. A series of indices may be chosen at random, these specify candidates, and these candidates may be evaluated using visual or automatic methods. A given coordinate (x, y . . . ) may be calculated independently from other coordinates, and may be accessed randomly. A series of multiplicative constants selected in this manner may be used to increase the dimensionality of the Blue Noise space, and to make the output more random.

7. Structured Error Diffusion Halftoning

In an embodiment, structured error diffusion halftoning logic 222 may implement a structured error diffusion halftoning process as further detailed below. In screen printing, a stencil is used to block the conveyance of ink that is applied by a squeegee through a supporting screen mesh. Thus, opaque areas of the stencil prevent movement of ink onto the substrate. However, a stencil element must have at least a particular minimum size to attach to the screen mesh. A single screen print has areas that are either printing or non-printing; thus, screen printing is a binary printing process in which ink either passes the stencil or is blocked.

In an embodiment, a method creates stencils for screen print that represent smooth gradations of tone with binary textures, termed halftone patterns. Though there are many methods for producing halftone patterns, certain methods produce fine, randomized dot patterns that work particularly well for screen printing. These methods generate blue noise patterns using Error Diffusion. While halftone patterns generated by blue noise are pleasing when used to render continuous time images, images with a mix of continuous tone and hard edge line detail will experience some loss of detail. In an embodiment, a process blends blue noise diffusion with suppression of noise for structured image elements.

Digital halftones using Error Diffusion may be produced using Floyd-Steinberg dithering. Improvements to Floyd-Steinberg dithering are described in R. Ulichney, "Digital Halftoning," MIT Press (1987). To balance the halftone rendering of blue noise with structured images, some approaches rely on sharpening the original image before it is rendered with Error Diffusion. Other approaches rely on using frequency space methods to annotate the local directional bias of an image portion, and use these to select error distribution coefficients in a second pass. In an embodiment, an error diffusion halftoning process can produce an image with a high frequency, randomized halftone pattern that represents an input image well, is pleasing to the eye; inhibits the random diffusion of the pattern where there is a high contrast, or a structured image element; adaptively modify the error distribution coefficients to enhance the image structure; compares favorably in time to other Error Diffusion approaches; and produce an output halftone pattern that suppresses Moiré patterns that may be caused by pattern interference with the screen mesh.

Figure 4:
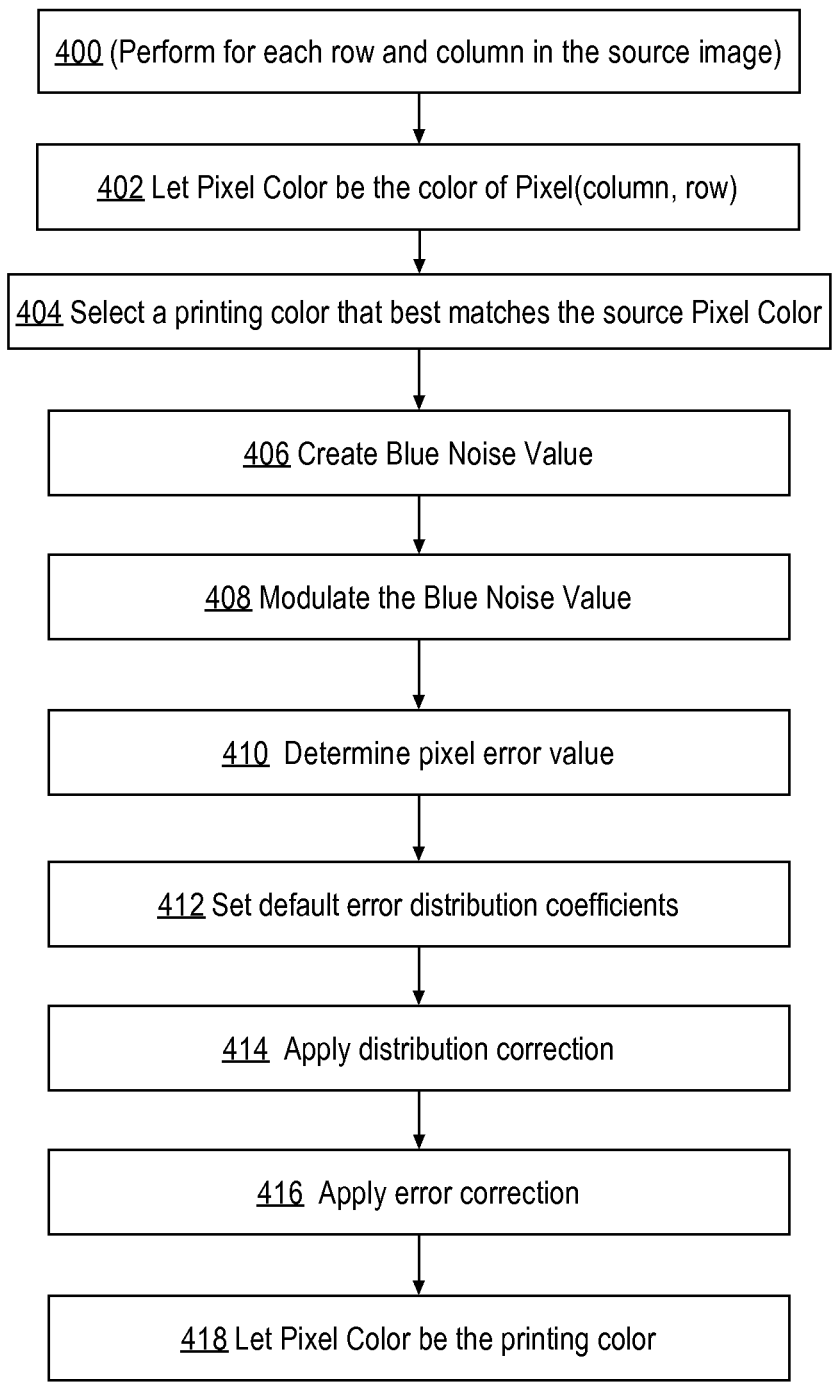
FIG. 4 illustrates certain steps in a process of structured error diffusion halftoning.

FIG. 4 illustrates certain steps in a process of structured error diffusion halftoning. Block 400 indicates that subsequent steps of the example process are to be performed for each row and column in the source image. At step 402, a Pixel Color value is set to the color of a particular pixel at a position indicated by a current column value and row value. As suggested by step 400, in a practical embodiment steps 402 to 418 are repeated and the row and column values are monotonically incremented until all pixels have been processed.

In step 404, the process selects a printing color value that best matches the source Pixel Color value.

In step 406, a Blue Noise Value is created. Embodiments may use the random number generator for position-based blue noise described in the preceding section to generate blue noise. In an embodiment, the current column value and current row value are provided to a blue noise generator, which returns the Blue Noise Value according to the process described above.

In step 408, the blue noise value is modulated. In pseudocode, step 408 may be represented as blueNoiseValue*ModulateFunction(pixelColor). The modulation function can scale the blue noise input overall, and to suppress noise more that a linear function would in full printing portions of the image, provide a broad, moderate noise for the middle tone grays, and maximize noise only for very light values.

In step 410, a pixel error value is determined. In an embodiment, a pixel error value for the current pixel is determined as: (pixelColor+blueNoiseValue)−printingColor.

In step 412, default error distribution coefficients are determined or set. In an embodiment, the coefficient relationships of TABLE 3 are used.

TABLE 3

DEFAULT ERROR DISTRIBUTION COEFFICIENTS errorDistribution_10 (amount to distribute to Pixel (column +1, row)).
errorDistribution_11 (amount to distribute to Pixel (column+1 , row+1)).
errorDistribution_01 (amount to distribute to Pixel (column , row+1)).
errorDistribution_M11 (amount to distribute to Pixel (column−1, row+1)).

In step 414, a distribution correction is applied. In an embodiment, applying the distribution correction may be implemented as represented in the pseudocode as stated in TABLE 4.

TABLE 4

APPLYING DISTRIBUTION CORRECTION

DistribCorrect0 = abs(((Pixel(column +1, row) +
   Pixel(column +1, row+1)) − (Pixel(column +1, row−1) +
   Pixel(column, row+1))) * aCorrectionScale
errorDistribution_10 += DistribCorrect0
errorDistribution_M11 −= DistribCorrect0
errorDistribution_01 −= DistribCorrect0
errorDistribution_11 += DistribCorrect0
DistribCorrect1 = abs((Pixel(column +1, row) +
   Pixel(column +1, row+1)) * aCorrectionScale
errorDistribution_10 += DistribCorrect1
errorDistribution_11 −= DistribCorrect1
DistribCorrect2 = abs((Pixel(column −1, row+1) +
   Pixel(column, row+1)) * aCorrectionScale
errorDistribution_11 += DistribCorrect2
errorDistribution_01 −= DistribCorrect2
Apply Error Correction:
Pixel(column +1, row) += (PixelError * errorDistribution_10)
Pixel(column +1, row+1) += (PixelError * errorDistribution_11)
Pixel(column, row+1) += (PixelError * errorDistribution_01)
Pixel(column−1, row+1) += (PixelError * errorDistribution_M11)
Set the pixelColor = printingColor In an embodiment, the diffusion of noise is suppressed by redirecting it in the direction of the gradient using the distribution correction. Consequently, edges and lines are preserved by suppressing the distribution of the sum of error and noise across the direction of the gradient. The value aCorrectionScale may balance the effect of the distribution correction.

The disclosed process is a single-pass solution, preserves input image tonality by distributing error with blue noise, and preserves image features by suppressing blue noise distribution across an image feature. Further, the amount of noise and the amount of noise-feature suppression may be adjusted for a particular image type, or application.

8. Error Diffusion Dot-Spread Correction

Figure 5A:
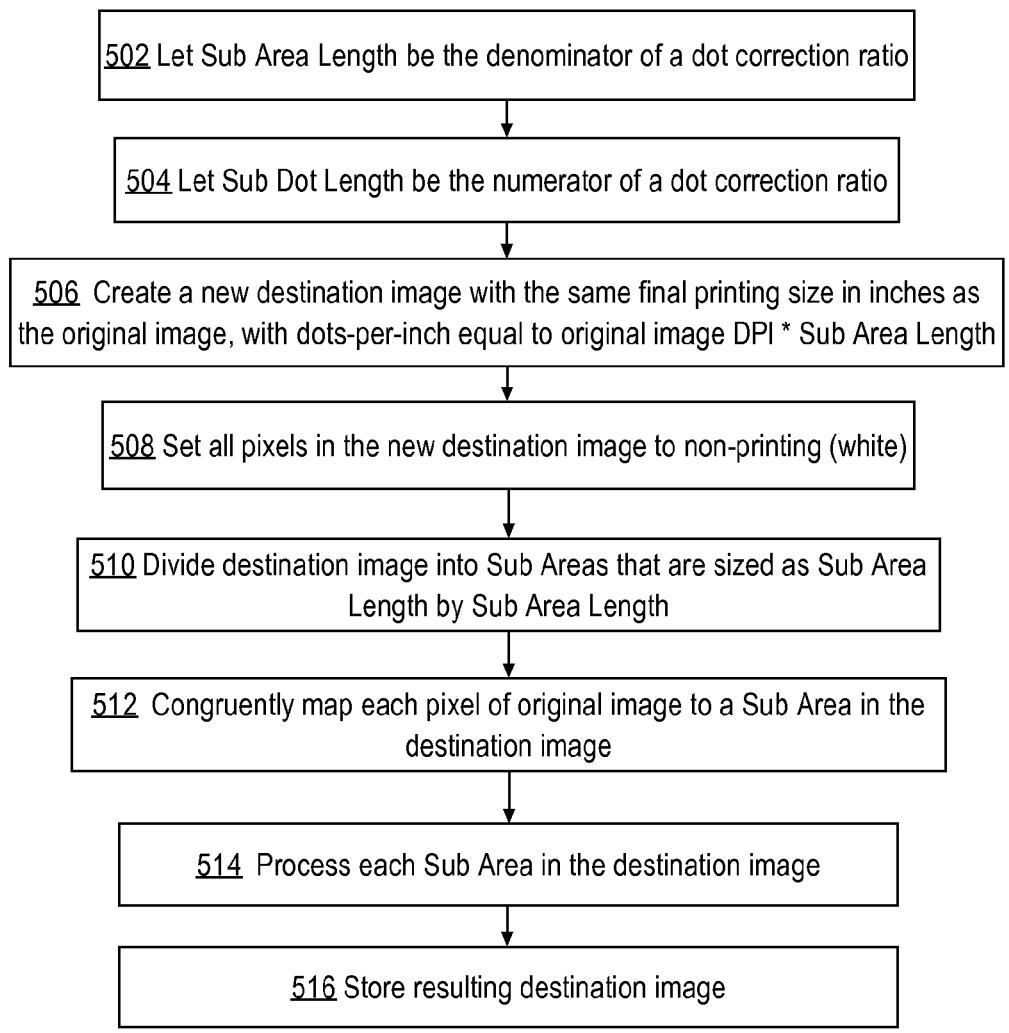
FIG. 5A illustrates certain steps in a process of error diffusion dot-spread correction.

FIG. 5A illustrates certain steps in a process of error diffusion dot-spread correction. FIGS. 5B, 5C, 5D, 5E illustrate transformation of pixel values of an original image to pixel values of a destination image in connection with error diffusion dot-spread correction.

In screen printing, inks tend to expand slightly beyond the edges of printed regions as a result of capillary action, gravity, and other forces acting upon the ink when in contact with a substrate under pressure. The squeegee in screen printing acts as a pump, pushing the ink through the stencil opening, and into the substrate. Diffusion into the substrate may be termed "dot spread" as individual dots of halftone images tend to spread and merge into larger blobs. In particular, when dot spread occurs between closely spaced printing and non-printing areas, the small non-printing area may fill in, causing the image to become darker. When dots are generated using an error diffusion algorithm, dot-spread has the effect of darkening mid-tone areas, and limiting the range of tone for a given color. Embodiments provide processes to correct, for dot spread, the structure of a digital image used in screen printing to print ranges of good value and color.

Some approaches to correct for dot spread are performed as an adjustment to the rate at which a dot in a halftone pattern grows, to adjust for the rate a printing tone will spread on the substrate. These approaches are termed Dot Growth algorithms. Most operate on a single sample that will result in changing the size of a single halftone dot. Some approaches examine the overall correction needed for a neighborhood, and distribute the correction to more than one dot in that neighborhood. In all cases, this method of dot correction is applied to a halftone pattern where a dot in a single location grows in size in response to a continuous tone sample.

However, Dot Growth algorithms are not easily applied to the binary, 1-bit patterns generated by the Error Diffusion halftone technique described above. Error Diffusion Halftones approximate levels of grey by varying the spacing of the dot, rather than its size. The result of this approach in screen printing is that the spacing between dots in a pattern can be of a much smaller size than is possible with traditional dot-growth half toning.

Adjusting error during the Error Diffusion halftone process to correct for dot spread causes coarsening the resulting halftone. The coarsening occurs because the highest frequency (finest detail) component of an Error Diffusion halftone is mid-tone grey. In representing mid-tone grey as black or dark grey, the finest gradation of tone is lost.

In an embodiment, correction for dot spread in screen printing for an Error Diffusion halftone is performed as a post-process after Error Diffusion. In an embodiment, the correction process reduces the size of printing dots that are adjacent to non-printing areas. In an embodiment, dot or pixel patterns that have a contiguous printing shape are not reduced in size. In an embodiment, non-printing dots, corresponding to small masked areas, are increased in size. In an embodiment, the overall correction cancels the diffusion of ink as it is applied through the stencil area of the screen.

In an embodiment, a dot spread correction approach receives as input a configurable dot spread value associated with a particular combination of screen mesh, screen ink, squeegee, and substrate. The dot spread value represents an actual expected dot spread amount for that combination of physical elements when they are used in actual screen printing. In an embodiment, determining a dot spread value comprises:

A. An image with a resolution of 1000 dpi is developed that has a series of lines and spaces across the image. The lines and the spaces start at 3 pixel width and 2 pixel spacing. A set of 5 lines is made for a given line width and spacing. The width and spacing is incremented by 1. As a result, a pattern of lines from 0.003" to 0.050" width and spacing are made.

B. The image is used to construct a screen stencil using the screen mesh to be calibrated.

C. The screen with the image of the lines is printed using the squeegee, ink and substrate to be calibrated. The printed substrate is examined. The minimum spacing between lines where the space is completely filed is recorded.

D. The dot spread is the recorded spacing divided by 2.

In an embodiment, a corrected dot size value is equal to the difference of a halftone dot size value less the actual or estimated dot spread value as determined above. A dot correction ratio may be expressed as the corrected dot size value divided by the halftone dot size value in rational number form. As one example:

halftoneDotSize=0.008"
dotSpread=0.002
CorrectedDotSize=0.006"
DotCorrectionRatio=6/8, reduced to a ratio value of 3/4.

In an embodiment, a process of correcting an image, previously created and stored using an error diffusion halftone process, for a given dot correction ratio initiates at step 502 of FIG. 5A in which an integer value denoted Sub Area Length is set equal to denominator of the dot correction ratio. In step 504, an integer value denoted Sub Dot Length is set equal to the numerator of the dot correction ratio. Thus, for the example dot correction ratio of 3/4, Sub Area Length is 4 and Sub Dot Length is 3.

In step 506, a new destination image is created and stored. Attributes of the new destination image are established such that the final printing size is the same value in inches as the original image, and the dots-per-inch (DPI) attribute is set equal to the original image's DPI*Sub Area Length. In step 508, all of the pixels in the new destination image are set to non-printing (white).

Figure 5B:
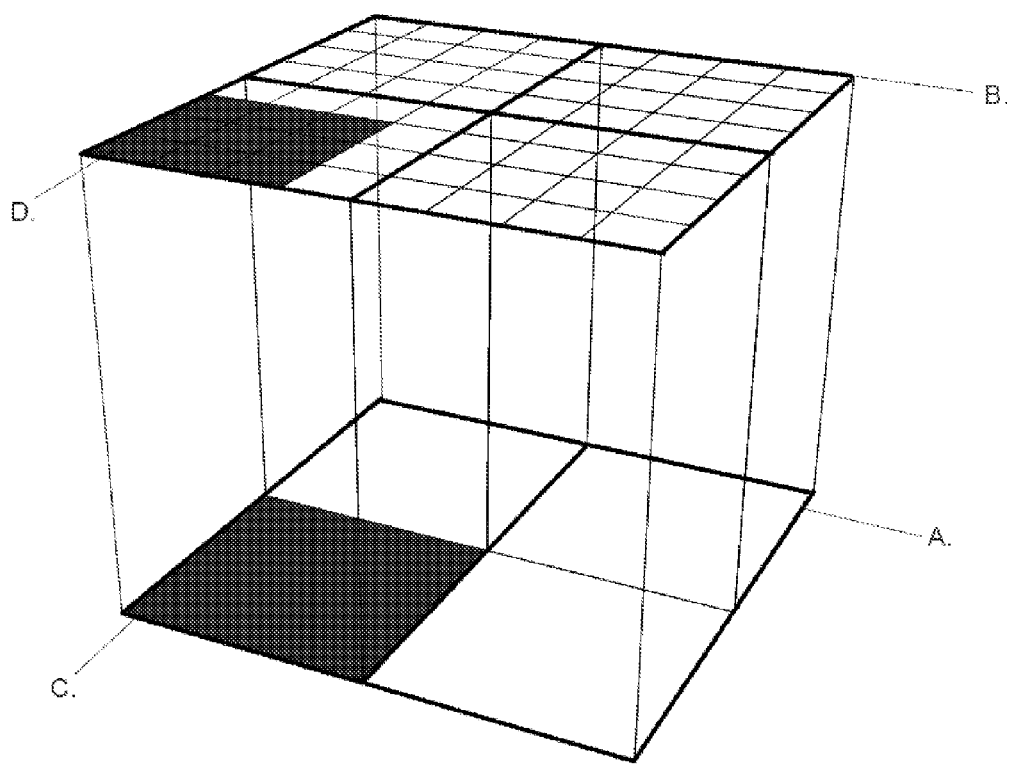
FIGS. 5B, 5C, 5D, 5E illustrate transformation of pixel values of an original image to pixel values of a destination image in connection with error diffusion dot-spread correction.

In step 510, the new destination image is divided into Sub Areas that are Sub Area Length by Sub Area Length in dimension. In step 512, each pixel in the original image is mapped congruently to a Sub Area in the destination image. Referring now to FIG. 5B, in one example embodiment, a pixel C of an original image A maps to a Sub Area D of a destination image B.

In step 514, each Sub Area in the destination image is processed. In an embodiment, the following steps are performed for each Sub Area in the destination image:

A. The upper left quadrant, of a size Sub Dot Length by Sub Dot Length, of the SubArea is set to the value of the corresponding pixel in the original image.

B. If the value of the corresponding pixel in the original image is printing (black), then the following steps C to E are performed; otherwise the next Sub Area is processed.

Figure 5C:
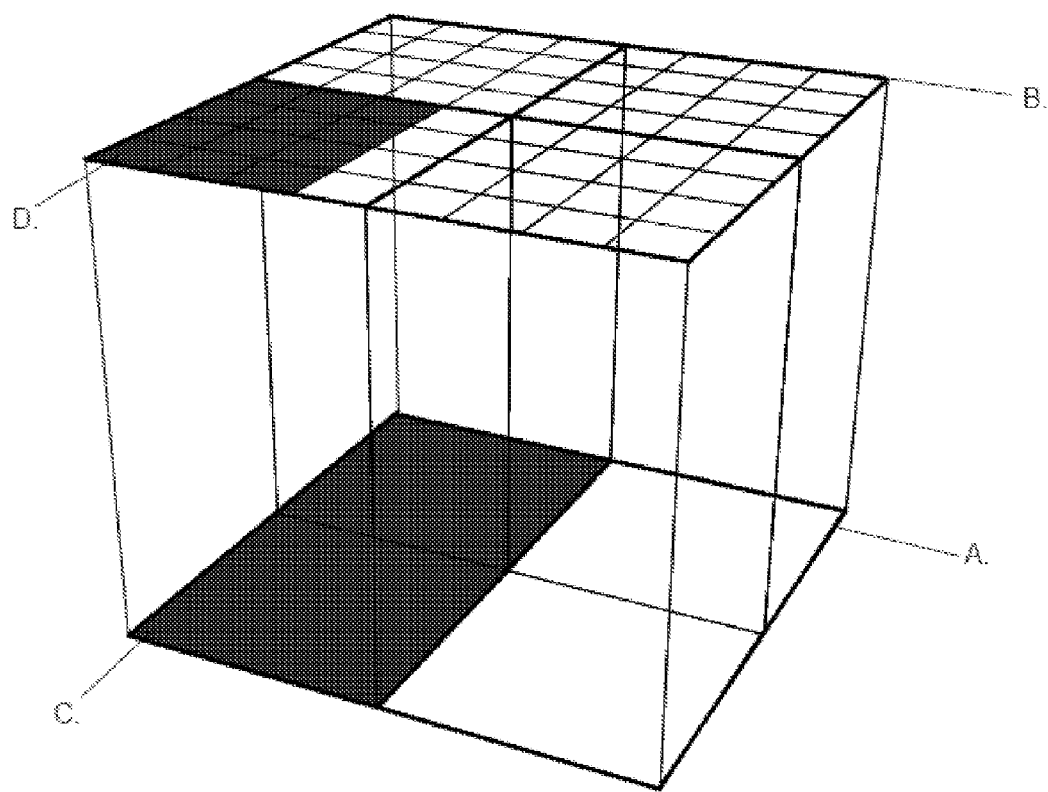

C. If the value of the adjacent right pixel in the original image is printing (black), then the upper right quadrant defined by the (x, y) coordinates (Sub Dot Length, 0) and (Sub Area Length, Sub Dot Length) is set to printing (black). FIG. 5C illustrates an example mapping in this situation of pixels C of the original image A to a quadrant D of a sub area of destination image B.

Figure 5D:
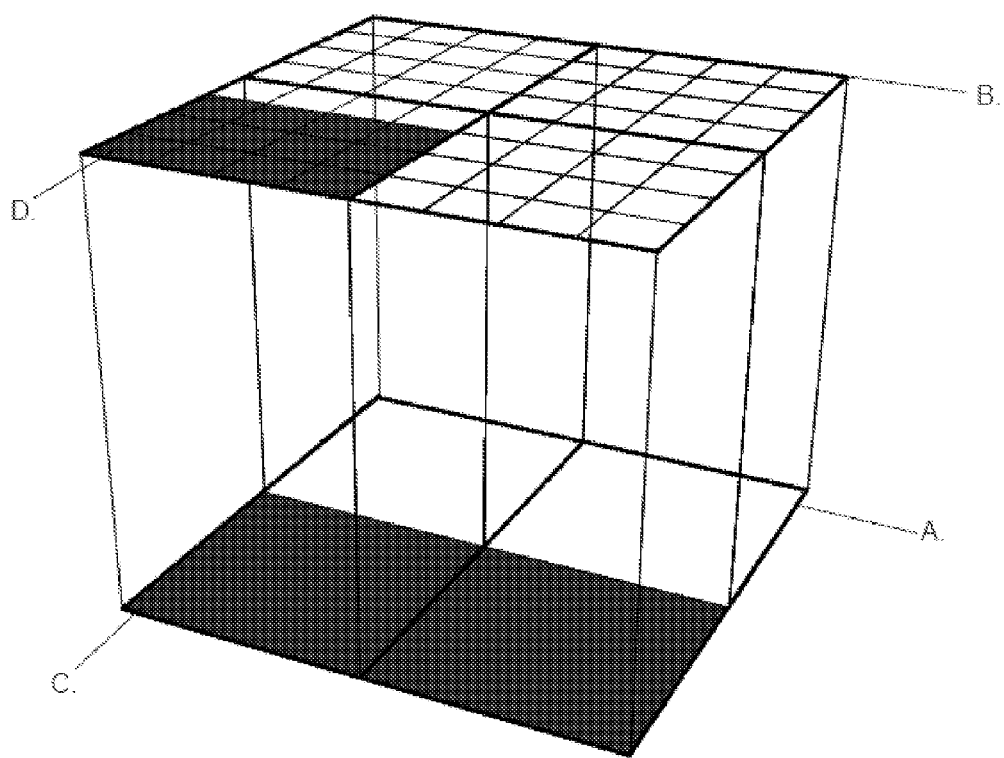

D. If the value of the adjacent lower pixel in the original image is printing (black), then the lower left quadrant defined by the (x, y) coordinates (0, Sub Dot Length) and (Sub Dot Length, Sub Area Length) is set to printing (black). FIG. 5D illustrates an example mapping in this situation of pixels C of the original image A to a quadrant D of a sub area of destination image B.

Figure 5E:
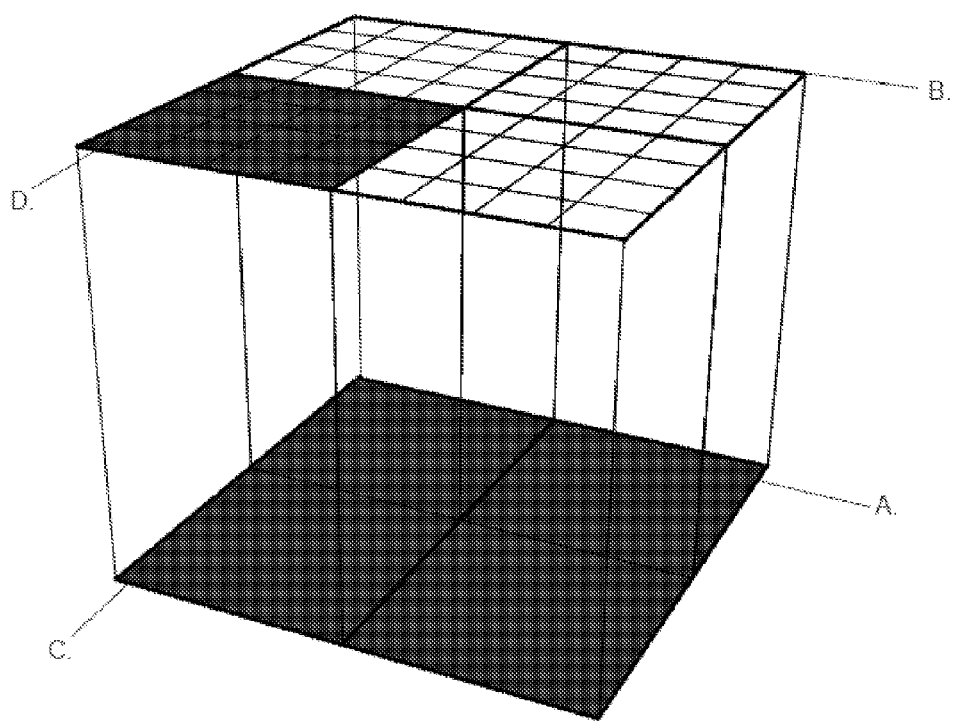

E. If the value of the adjacent right pixel in the original image is printing (black) and if the value of the adjacent lower pixel in the original image is printing (black) and if the value of the adjacent lower-right diagonal pixel in the original image is printing (black), then the lower right quadrant defined by the (x, y) coordinates (Sub Dot Length, Sub Dot Length) and (Sub Area Length, Sub Area Length) is set to printing (black). FIG. 5E illustrates an example mapping in this situation of pixels C of the original image A to a quadrant D of a sub area of destination image B.

The resulting destination image is now corrected for dot spread. In embodiments, the method correcting for dot spread described herein can be applied as a post process to existing error diffusion algorithms. If the original image is represented as a bit plane image, the process described above may be applied to many bit planes at once. The approach preserves the frequency of dot spacing provided by the Error Diffusion algorithm in the final printed product.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
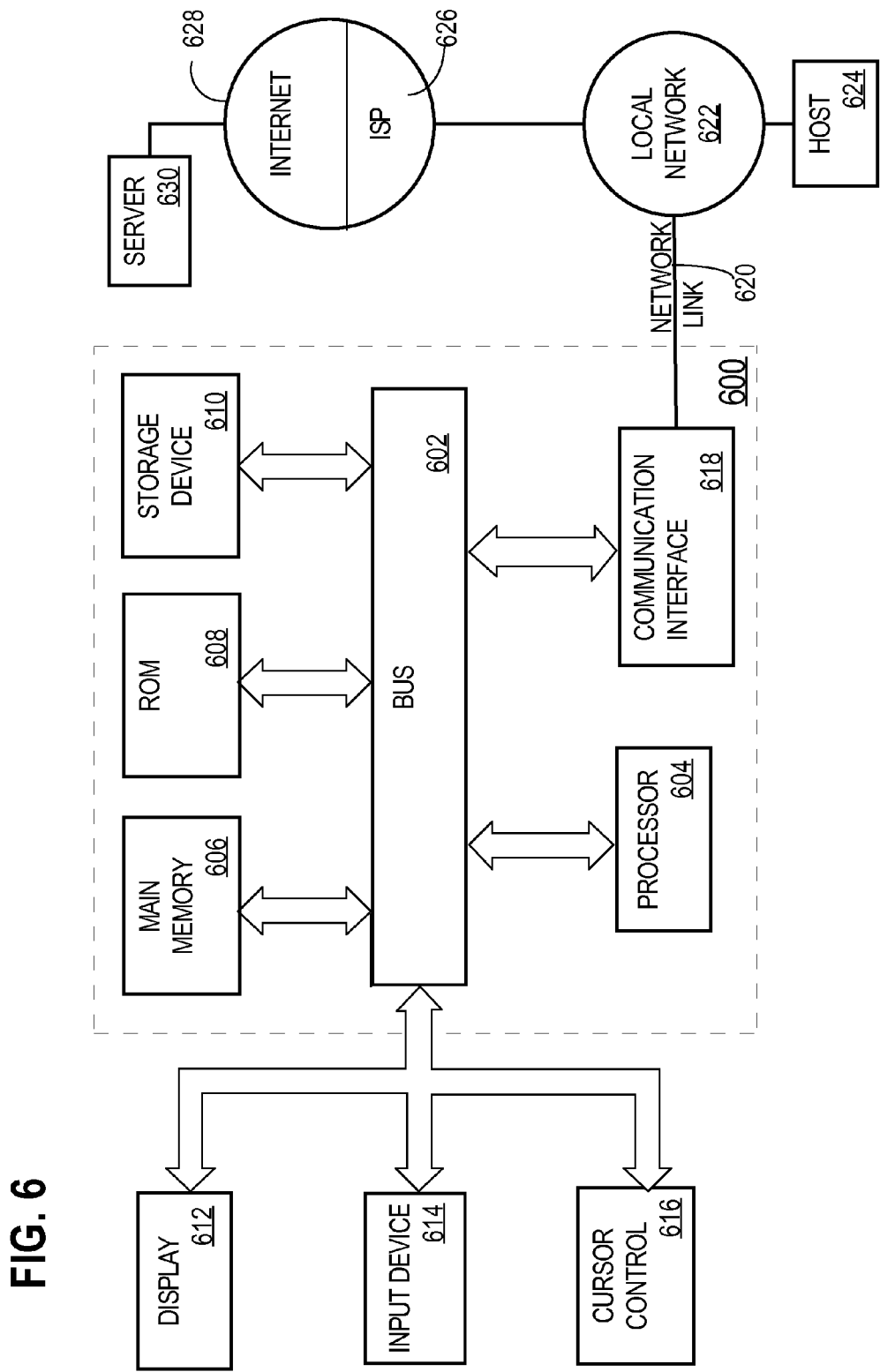
FIG. 6 illustrates a computer system with which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
obtaining a request associated with screen printing an image on a product, the request comprising at least one source image, and a key color value indicating a number of inks or key colors for use in the screen printing;
obtaining a key color area value indicating a minimum area for a particular color in the source image to be identified as one of the key colors;
computationally determining a set of key colors equal in size to the key color value by:
finding a candidate pixel for each connected subset of at least a particular size in the source image,
sorting candidate pixels into at least one color group based on distance in color space from a set of at least one representative color, each associated with a color group of the at least one color group, and
adding at least one new representative color to the set of representative colors based on maximizing a distance in color space between the at least one new representative color and the set of representative colors;
transforming the source image to a destination image that is usable in the screen printing of the product based on the set of key colors;
creating and storing two or more color separation images, each corresponding to one of the inks or key colors;

sending the destination image or the color separation images for use in screen printing;
wherein each of the steps is performed by one or more processors.

2. The method of claim 1, further comprising creating and storing a preview image representing an appearance of the destination image as expected to appear on the product after the screen printing; sending a response comprising the preview image.

3. The method of claim 2, further comprising applying structured error diffusion halftoning to the preview image by, for each particular pixel in the preview image:
adding random noise to the particular pixel;
finding a best match color for a color of the particular pixel, from among a limited set of colors;
determining a difference between the color of the particular pixel and the best match color;
distributing the difference to neighboring pixels, including distributing more of the difference to neighboring pixels that are least like the particular pixel;
setting the color of the particular pixel the best match color.

4. The method of claim 2, further comprising applying resolution limiting to the preview image by:
for each particular pixel in the preview image, labeling the particular pixel with a count of similar pixels that surround the particular pixel;
for each particular pixel in the preview image having a labeled count that is less than a threshold value, replacing the labeled count with the highest labeled count of other pixels that surround that particular pixel.

5. The method of claim 1, wherein the transforming comprises applying resolution limiting to the destination image.

6. The method of claim 1, wherein the request further comprises a selection to use halftones in screen printing the product, wherein the transforming further comprises applying structured error diffusion halftoning to the destination image;
applying resolution limiting to the destination image.

7. The method of claim 6, wherein the transforming further comprises applying error diffusion dot spread correction to the destination image.

8. The method of claim 7, wherein applying dot spread correction comprises:
determining a dot correction ratio for the destination image, wherein the dot correction ratio relates a first actual expected halftone dot size to a second halftone dot size that is corrected for expected dot spread;
creating and storing a new destination image having a resolution in dots per inch (DPI) equal to a DPI of the prior destination image multiplied by a denominator of the dot correction ratio;
congruently mapping each pixel of the prior destination image to a sub area of the new destination image, wherein a sub area has a length and a width in pixels equal to the denominator of the dot correction ratio;
determining a portion of each mapped sub area that should be marked for printing based upon a printing state of the corresponding mapped pixel of the prior destination image and repeating the determining for all sub areas of the new destination image;
creating and storing an updated new destination image based on the determining.

9. The method of claim 6, wherein applying structured error diffusion halftoning to the destination image comprises, for each particular pixel in the destination image:
adding random noise to the particular pixel;
finding a best match color for a color of the particular pixel, from among a limited set of colors;
determining a difference between the color of the particular pixel and the best match color;
distributing the difference to neighboring pixels, including distributing more of the difference to neighboring pixels that are least like the particular pixel;
setting the color of the particular pixel the best match color.

10. The method of claim 6, wherein applying resolution limiting to the destination image comprises:
for each particular pixel in the destination image, labeling the particular pixel with a count of similar pixels that surround the particular pixel;
for each particular pixel in the destination image having a labeled count that is less than a threshold value, replacing the labeled count with the highest labeled count of other pixels that surround that particular pixel.

11. The method of claim 1, further comprising generating one or more random binary blue noise values based on: three multiplicative constants, wherein each of the multiplicative constants comprises a combination of eight binary substrings; a location in the destination image that includes a color value; and accumulating operations by Boolean exclusive OR (XOR) of each of the multiplicative constants with the location value and an output respectively.

12. The method of claim 11, wherein the substrings are selected from the set consisting of '10'; '011'; '101'; '1011'; '1101'; '10001'; '10011'; '11001'.

13. The method of claim 1, further comprising applying structured error diffusion halftoning to the destination image by, for each particular pixel in the destination image:
adding random noise to the particular pixel;
finding a best match color for a color of the particular pixel, from among a limited set of colors;
determining a difference between the color of the particular pixel and the best match color;
distributing the difference to neighboring pixels, including distributing more of the difference to neighboring pixels that are least like the particular pixel;
setting the color of the particular pixel the best match color.

14. The method of claim 1, further comprising applying resolution limiting to the destination image by:
for each particular pixel in the destination image, labeling the particular pixel with a count of similar pixels that surround the particular pixel;
for each particular pixel in the destination image having a labeled count that is less than a threshold value, replacing the labeled count with the highest labeled count of other pixels that surround that particular pixel.

15. A non-transitory computer-readable storage medium storing one or more sequences of instructions which when executed cause one or more processors to perform:
obtaining a request associated with screen printing an image on a product, the request comprising at least one source image, a key color value indicating a number of inks or key colors for use in the screen printing;
obtaining a key color area value indicating a minimum area for a particular color in the source image to be identified as one of the key colors;
computationally determining a set of key colors image equal in size to the key color value by:
finding a candidate pixel for each connected subset of at least a particular size in the source image,
sorting candidate pixels into at least one color group based on distance in color space from a set of at least one representative color, each associated with a color group of the at least one color group, and adding at least one new representative color to the set of representative colors based on maximizing a distance in color space between the at least one new representative color and the set of representative colors;

transforming the source image to a destination image that is usable in the screen printing of the productbased on the set of key colors;

creating and storing two or more color separation images, each corresponding to one of the inks or key colors;

sending the destination image or the color the separation images for use in screen printing.

16. The computer-readable storage medium of claim 15, further comprising sequences of instructions which when executed cause the one or more processors to perform creating and storing a preview image representing an appearance of the destination image as expected to appear on the product after the screen printing; sending a response comprising the preview image.

17. The computer-readable storage medium of claim 16, further comprising instructions which when executed cause performing applying structured error diffusion halftoning to the preview image by, for each particular pixel in the preview image:
  adding random noise to the particular pixel;
  finding a best match color for a color of the particular pixel, from among a limited set of colors;
  determining a difference between the color of the particular pixel and the best match color;
  distributing the difference to neighboring pixels, including distributing more of the difference to neighboring pixels that are least like the particular pixel;
  setting the color of the particular pixel the best match color.

18. The computer-readable storage medium of claim 16, further comprising instructions which when executed cause performing applying resolution limiting to the preview image by:
  for each particular pixel in the preview image, labeling the particular pixel with a count of similar pixels that surround the particular pixel;
  for each particular pixel in the preview image having a labeled count that is less than a threshold value, replacing the labeled count with the highest labeled count of other pixels that surround that particular pixel.

19. The computer-readable storage medium of claim 15, wherein the instructions which when executed cause performing transforming comprise instructions which when executed cause performing applying resolution limiting to the destination image.

20. The computer-readable storage medium of claim 15, wherein the request further comprises a selection to use halftones in screen printing the product, wherein the instructions which when executed cause performing transforming further comprise instructions which when executed cause performing applying structured error diffusion halftoning to the destination image; applying resolution limiting to the destination image.

21. The computer-readable storage medium of claim 20, wherein the instructions which when executed cause performing transforming further comprise instructions which when executed cause performing applying error diffusion dot spread correction to the destination image.

22. The computer-readable storage medium of claim 21, wherein the instructions which when executed cause performing applying dot spread correction comprise instructions which when executed cause performing:
  determining a dot correction ratio for the destination image, wherein the dot correction ratio relates a first actual expected halftone dot size to a second halftone dot size that is corrected for expected dot spread;
  creating and storing a new destination image having a resolution in dots per inch (DPI) equal to a DPI of the prior destination image multiplied by a denominator of the dot correction ratio;
  congruently mapping each pixel of the prior destination image to a sub area of the new destination image, wherein a sub area has a length and a width in pixels equal to the denominator of the dot correction ratio;
  determining a portion of each mapped sub area that should be marked for printing based upon a printing state of the corresponding mapped pixel of the prior destination image and repeating the determining for all sub areas of the new destination image;
  creating and storing an updated new destination image based on the determining.

23. The computer-readable storage medium of claim 20, wherein the instructions which when executed cause performing applying structured error diffusion halftoning to the destination image comprise instructions which when executed cause performing, for each particular pixel in the destination image:
  adding random noise to the particular pixel;
  finding a best match color for a color of the particular pixel, from among a limited set of colors;
  determining a difference between the color of the particular pixel and the best match color;
  distributing the difference to neighboring pixels, including distributing more of the difference to neighboring pixels that are least like the particular pixel;
  setting the color of the particular pixel the best match color.

24. The computer-readable storage medium of claim 20, wherein the instructions which when executed cause performing applying resolution limiting to the destination image comprise instructions which when executed cause performing:
  for each particular pixel in the destination image, labeling the particular pixel with a count of similar pixels that surround the particular pixel;
  for each particular pixel in the destination image having a labeled count that is less than a threshold value, replacing the labeled count with the highest labeled count of other pixels that surround that particular pixel.

25. The computer-readable storage medium of claim 15, further comprising instructions which when executed cause the one or more processors to perform generating one or more random binary blue noise values based on: three multiplicative constants, wherein each of the multiplicative constants comprises a combination of eight binary substrings; a location in the destination image that includes a color value; and accumulating operations by Boolean exclusive OR (XOR) of each of the multiplicative constants with the location value and an output respectively.

26. The computer-readable storage medium of claim 25, wherein the substrings are selected from the set consisting of '10'; '011'; '101'; '1011'; '1101'; '10001'; '10011'; '11001'.

27. The computer-readable storage medium of claim 15, further comprising instructions which when executed cause performing applying structured error diffusion halftoning to the destination image by, for each particular pixel in the destination image:
  adding random noise to the particular pixel;
  finding a best match color for a color of the particular pixel, from among a limited set of colors;

determining a difference between the color of the particular pixel and the best match color;

distributing the difference to neighboring pixels, including distributing more of the difference to neighboring pixels that are least like the particular pixel;

setting the color of the particular pixel the best match color.

28. The computer-readable storage medium of claim 15, further comprising instructions which when executed cause performing applying resolution limiting to the destination image by:

for each particular pixel in the destination image, labeling the particular pixel with a count of similar pixels that surround the particular pixel;

for each particular pixel in the destination image having a labeled count that is less than a threshold value, replacing the labeled count with the highest labeled count of other pixels that surround that particular pixel.

* * * * *